(12) United States Patent
Tamamura et al.

(10) Patent No.: US 6,535,566 B1
(45) Date of Patent: Mar. 18, 2003

(54) DEMODULATING METHOD AND RECEIVER APPARATUS

(75) Inventors: Masaya Tamamura, Kawasaki (JP); Ken Yamauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/298,052

(22) Filed: Apr. 22, 1999

(30) Foreign Application Priority Data

Apr. 30, 1998 (JP) .......................................... 10-121073

(51) Int. Cl.$^7$ .............................................. H04L 25/00
(52) U.S. Cl. ...................................................... 375/371
(58) Field of Search ................................ 375/371, 373, 375/316, 376, 377

(56) References Cited

U.S. PATENT DOCUMENTS

| | | | | |
|---|---|---|---|---|
| 4,538,120 A | * | 8/1985 | Hawkes | ........................ 331/12 |
| 4,959,617 A | * | 9/1990 | Martin | ........................ 327/12 |

FOREIGN PATENT DOCUMENTS

| JP | 1-12556 | 5/1989 |
|---|---|---|
| JP | 6-14069 | 1/1994 |

OTHER PUBLICATIONS

Katoh et al., "A study of Satellite ISDB Transmission System", ITE Technical Report vol. 21, No. 25, pp. 1–5, Mar. 1997.

* cited by examiner

*Primary Examiner*—Stephen Chin
*Assistant Examiner*—Kevin Kim
(74) *Attorney, Agent, or Firm*—Staas & Halsey LLP

(57) ABSTRACT

A demodulating method demodulates a received signal received by a demodulator unit by detecting an absolute phase of signal points of the received signal. The demodulating method includes a first step of detecting the absolute phase by a first phase detecting method, a second step of detecting the absolute phase by a second phase detecting method in parallel with the first step, where the second phase detecting method has a slower detection speed or a higher detection accuracy than the first phase detecting method, and a third step of determining the absolute phase based on a phase detection result of the first step when phase detection results of the first and second steps are the same, and determining the absolute phase based on the phase detection result of the second step when the phase detection results of the first and second steps are different.

48 Claims, 28 Drawing Sheets

DEMODULATING METHOD AND RECEIVER APPARATUS

BACKGROUND OF THE INVENTION

1. Field of the Invention

The present invention generally relates to demodulating methods and receiver apparatuses, and more particularly to a demodulating method which demodulates a received signal received by a receiver apparatus by detecting an absolute phase of signal points, and a receiver apparatus which employs such a demodulating method.

2. Description of the Related Art

In communication systems such as digital satellite broadcast systems, the communication is made by employing a digital modulation technique such as the BPSK, QPSK, nPSK and nQAM. In such communication systems, the signal modulated by the digital modulation technique is demodulated in a digital demodulator unit of a receiver apparatus, but in general, the detection of the absolute phase becomes uncertain at the time of the demodulation.

FIGS. 1 and 2 respectively are diagrams for explaining the detection of the absolute phase when demodulating a signal which is demodulated by the 8PSK. If it is assumed that FIG. 1 shows the correct positions of data 1 through 8, a normal digital demodulator unit cannot judge such correct positions of the data 1 through 8, and can only judge the positions where the data should stop. For this reason, even if the positions where the data should stop are correct, the positions of the data 1 through 8 may deviate by 45 degrees from the correct positions as shown in FIG. 2, for example. In this case, with respect to the correct positions of the data 1 through 8 shown in FIG. 1, a total of 8 possible patterns could occur as the phase error, including the pattern shown in FIG. 2.

Conventionally, in order to detect the phase error described above, it is necessary to successively detect the 8 phases. According to a normal phase error detecting method, if the received signal is made up of synchronizing signals and data as shown in FIG. 3 and a number of regularly incoming synchronizing signals which are consecutively detected reaches a set value, it is regarded that 1 phase of the data is detected. All of the 8 phases are detected in a similar manner.

Generally, the synchronizing signal is made up of several bits. This is because, if the number of bits forming the synchronizing signal is small, the possibility of a signal having a pattern identical to that of the synchronizing signal being accidentally generated in a data sequence increases. For this reason, when a reception state of the receiving unit is poor due to the weather conditions or the like and considerable error is generated in the received signal due to noise, error is also inevitably generated in the synchronizing signal. When the error is generated in the synchronizing signal, it takes time to detect the synchronizing signal, and in an extreme case, it may become impossible to detect the synchronizing signal.

In the conventional receiver apparatus, the absolute phase of the signal points of the received signal is detected by a phase detecting method having a high detection accuracy when demodulating the received signal, so as to suppress the undesirable effects of the error caused by the noise, even in a case where the reception state of the receiver apparatus is poor. However, the detection speed of the phase detecting method having the high detection accuracy is slow. Consequently, there is a problem in that a relatively long time is always required to detect the absolute phase, regardless of the reception state of the receiver apparatus.

SUMMARY OF THE INVENTION

Accordingly, it is a general object of the present invention to provide a novel and useful demodulating method and receiver apparatus, in which the problems described above are eliminated.

Another and more specific object of the present invention is to provide a demodulating method and a receiver apparatus which can improve the detection accuracy and the detection speed of the absolute phase of the signal points of the received signal, regardless of the reception state of the receiver apparatus.

Still another object of the present invention is to provide a demodulating method for demodulating a received signal received by a demodulator unit by detecting an absolute phase of signal points of the received signal, comprising a first step of detecting the absolute phase by a first phase detecting method, a second step of detecting the absolute phase by a second phase detecting method in parallel with the first step, where the second phase detecting method has a slower detection speed or a higher detection accuracy than the first phase detecting method, and a third step of determining the absolute phase based on a phase detection result of the first step when phase detection results of the first and second steps are the same, and determining the absolute phase based on the phase detection result of the second step when the phase detection results of the first and second steps are different. According to the demodulating method of the present invention, it is possible to improve the detection accuracy and the detection speed of the absolute phase of the signal points of the received signal, regardless of the reception state of the receiver apparatus.

A further object of the present invention is to provide a receiver apparatus having a demodulator unit which demodulates a received signal by detecting an absolute phase of signal points of the received signal, wherein the demodulator unit comprises a first detector part detecting the absolute phase by a first phase detecting method, a second detector part detecting the absolute phase by a second phase detecting method in parallel with the first detector part, where the second phase detecting method has a slower detection speed or a higher detection accuracy than the first phase detecting method, and a phase determination part determining the absolute phase based on a phase detection result of the first detector part when phase detection results of the first and second detector parts are the same, and determining the absolute phase based on the phase detection result of the second detector part when the phase detection results of the first and second detector parts are different. According to the receiver apparatus of the present invention, it is possible to improve the detection accuracy and the detection speed of the absolute phase of the signal points of the received signal, regardless of the reception state of the receiver apparatus.

Other objects and further features of the present invention will be apparent from the following detailed description when read in conjunction with the accompanying drawings.

DESCRIPTION OF THE PREFERRED EMBODIMENTS

Figure 4:
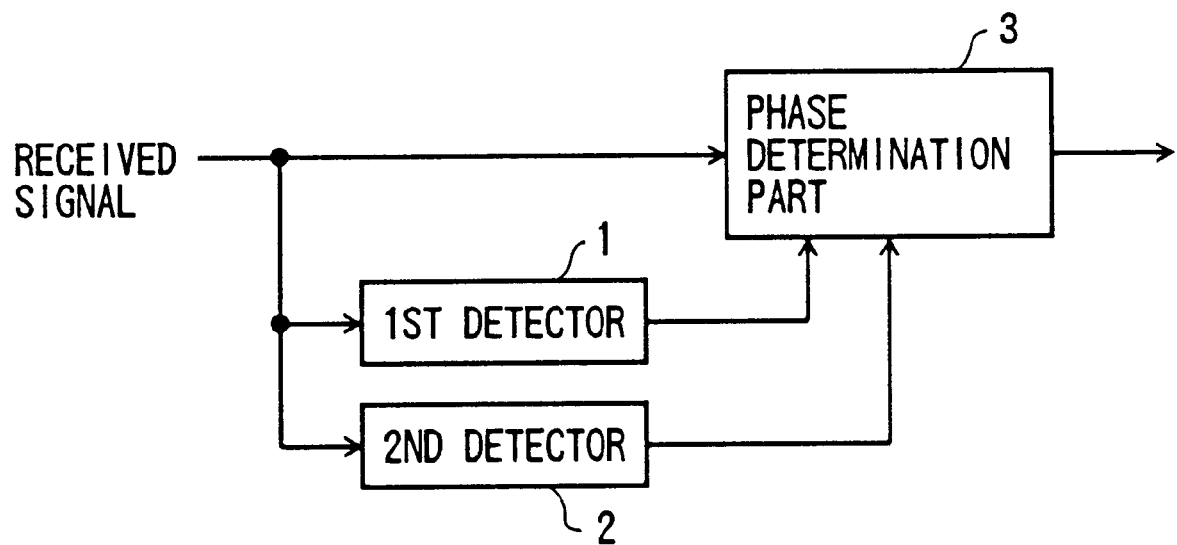
FIG. 4 is a system block diagram showing the general construction of a demodulator unit of a receiver apparatus according to the present invention.

First, a description will be given of the operating principle of the present invention, by referring to FIG. 4. FIG. 4 is a system block diagram showing the general construction of a demodulator unit of a receiver apparatus according to the present invention.

The demodulator unit shown in FIG. 4 includes a first detector 1 and a second detector 2 which detect the absolute phase of signal points of a received signal, and a phase determination part 3. The first detector 1 detects the absolute phase by a first phase detecting method, and the second detector 2 detects the absolute phase by a second phase detecting method. The second phase detecting method has a detection speed which is slower than that of the first phase detecting method or, has a detection accuracy which is higher than that of the first detecting method. In addition, the first detector 1 and he second detector 2 detect the absolute phase in parallel.

The phase determination part 3 determines the absolute phase based on a phase detection result of the first detector 1 when the phase detection results of the first detector 1 and the second detector 2 are the same, and determines the absolute phase based on the phase detection result of the second detector 2 when the phase detection results of the first detector 1 and the second detector 2 are mutually different.

In a case where the amount of noise included in the received signal is relatively small, it is possible to accurately detect the absolute phase by the first phase detecting method, and thus, the phase detection results of the first and second detectors 1 and 2 become the same. Accordingly, the absolute phase is determined based on the phase detection result of the first detector 1 in this case, and the absolute phase can be detected at a high speed.

On he other hand, even in a case where the amount of noise included in the received signal is relatively large, the phase detection results of the first and second detectors 1 and 2 may become the same. In such a situation, the absolute phase is determined based on the phase detection result of the first detector 1, and thus, it is possible to detect the absolute phase at a high speed. In addition, if the phase detection results of the first and second detectors 1 and 2 are mutually different, it is possible to determine the absolute phase based on the phase detection result of the second detector 2 at the time when it is found that the phase detection results of the first and second detectors 1 and 2 are mutually different, thereby enabling a high-speed correction of the detected phase. In other words, since the absolute phase is once provisionally detected based on the phase detection result of the first detector 1, regardless of the amount of noise included in the received signal, it is possible to detect the absolute phase at a high speed because the absolute phase which is provisionally determined based on the phase detection result of the first detector 1 is determined as being the absolute phase if the phase detection results of the first and second detectors 1 and 2 become the same.

Next, a description will be given of embodiments of a demodulating method according to the present invention and the receiver apparatus according to the present invention, by referring to FIG. 4 and the subsequent drawings.

Figure 5:
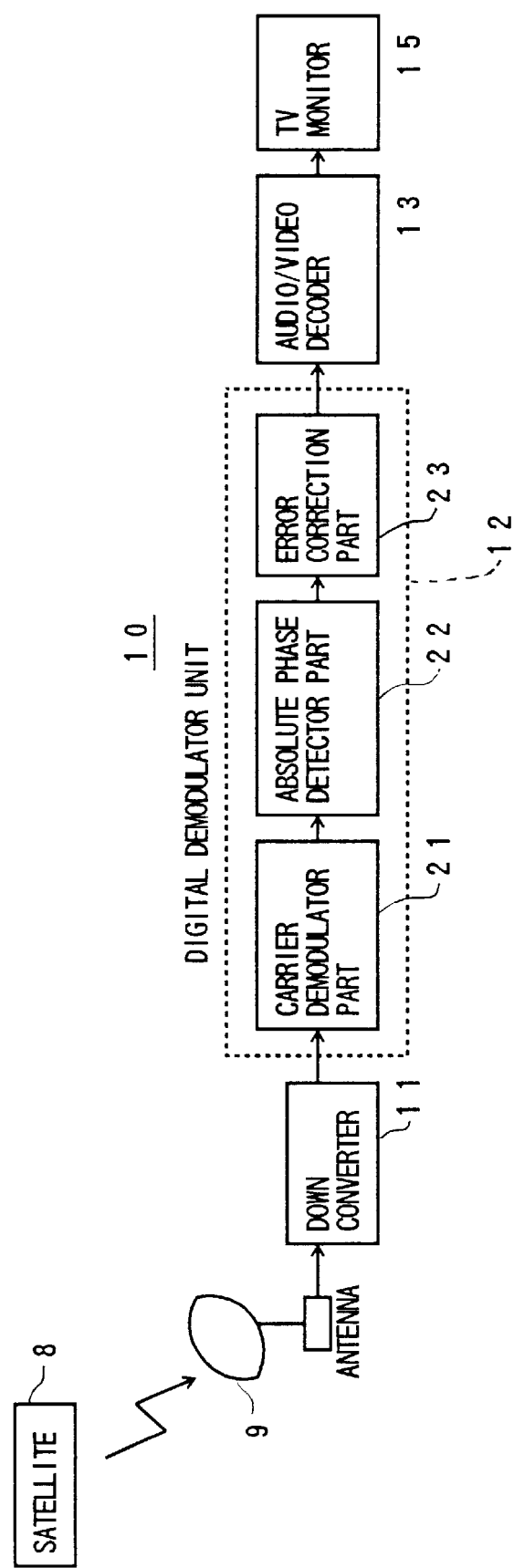
FIG. 5 is a system block diagram showing an embodiment of the receiver apparatus according to the present invention.

FIG. 5 is a system block diagram showing an embodiment of the receiver apparatus according to the present invention. In this embodiment of the receiver apparatus, the present invention is applied to a digital satellite broadcast system.

In FIG. 5, a receiver apparatus 10 generally includes a down converter 11, a digital demodulator unit 12, and an audio/video decoder 13. The receiver apparatus 10 is coupled to an antenna 9 and a television (TV) monitor 15. The digital demodulator unit 12 includes a carrier demodulator part 21, an absolute phase detector part 22, and an error correction part 23.

A signal which is modulated according to a digital modulation technique and is transmitted from a satellite 8 is received by the antenna 9, and a received signal is supplied to the down converter 11. The down converter 11 frequency-converts the received signal to a low frequency suited for a signal processing carried out at a latter stage, and a frequency converted received signal is supplied to the digital demodulator unit 12. In the digital demodulator unit 12, the carrier demodulator part 21 demodulates the carrier of the received signal. The absolute phase detector part 22 detects the absolute phase of signal points of the received signal based on an output of the carrier demodulator part 21. In addition, the error correction part 23 corrects an error based on an output of the absolute phase detector part 22.

The audio/video decoder 13 decodes an audio/video signal within the received signal based on the output of the error correction part 23 of the digital demodulator unit 12, and supplies a decoded audio/video signal to the TV monitor 15. Hence, the TV monitor 15 reproduces the sound and image based on the decoded audio/video signal.

This embodiment of the receiver apparatus is characterized by the operation of particularly the absolute phase detector part 22 of the digital demodulator unit 12. For example, known circuits and units may be used for parts other than the digital demodulator unit 12. Accordingly, it is also possible to use known circuits and units for the carrier demodulator part 21 and the error correction part 23 of the digital demodulator unit 12. In addition, the functions of the digital demodulator unit 12 may be realized by a computer system shown in FIG. 6.

Figure 6:
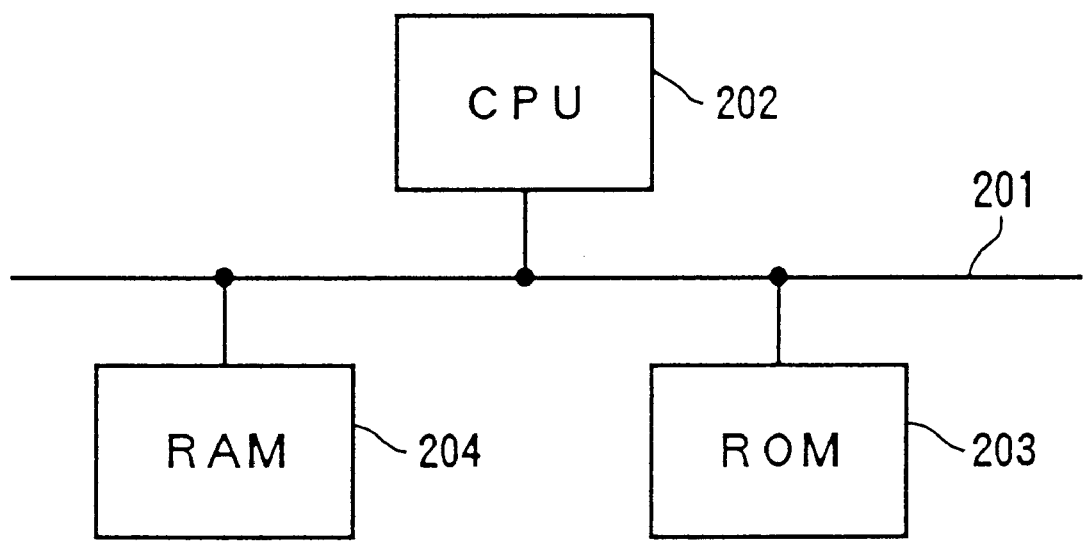
FIG. 6 is a system block diagram showing a computer system which realizes the functions of a digital demodulator unit.

The computer system shown in FIG. 6 includes a CPU 202, a ROM 203 and a RAM 204 which are coupled to each other via a bus 201. The CPU 202 realizes the functions of the digital demodulator unit 12 by executing programs. The programs to be executed by the CPU 202 are stored in the ROM 203. In addition, the RAM 204 stores data including intermediate data obtained during computation processes carried out by the CPU 202. The ROM 203 and the RAM 204 may be formed by a single storage medium or, by independent storage mediums. In this case, various kinds of semiconductor devices, various kinds of disks including magnetic disks, optical disks and magneto-optical disks, card-shaped storage mediums and the like may be used as the storage medium. Of course, when using the disk as the storage medium, a disk drive which drives the disk is coupled to the bus 201.

Figure 7:
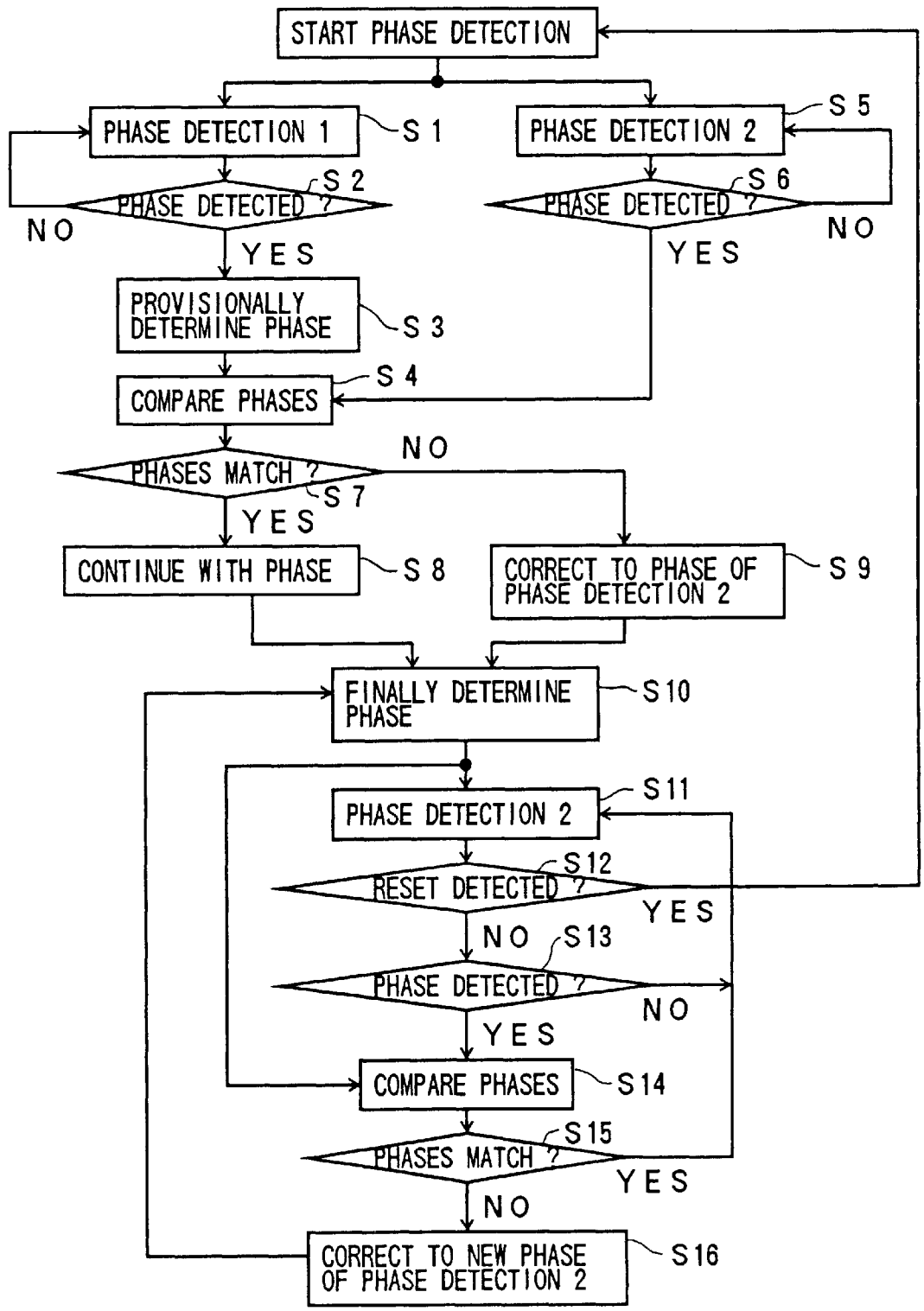
FIG. 7 is a flow chart for explaining the operation of a CPU of the computer system when the operation of an absolute phase detector part is realized by software.

FIG. 7 is a flow chart for explaining the operation of the CPU 202 of the computer system shown in FIG. 6 when realizing the operation of the absolute phase detector part 22 of the digital demodulator unit 12 by software. The process shown in FIG. 7 corresponds to an embodiment of the demodulating method according to the present invention.

In FIG. 7, when the absolute phase detecting process is started, a step S1 detects the absolute phase of the signal points of the received signal which is obtained via the down converter 11 and the carrier demodulator part 21, using a first phase detecting method. A step S2 decides whether or not the absolute phase is detected. If the decision result in the step S2 is YES, a step S3 provisionally determines the absolute phase based on the detection result, and the process advances to a step S4.

On the other hand, in parallel with the step S1, a step S5 detects the absolute phase of the signal points of the received signal which is obtained via the down converter 11 and the carrier demodulator part 21, using a second phase detecting method. This second phase detecting method has a detection speed which is slower than that of the first phase detecting method or, has a detection accuracy which is higher than that of the first phase detecting method. In this embodiment, a range in which no detection error is generated with respect to the amount of noise included in the received signal is set larger for the second phase detecting method than the first phase detecting method. Hence, an erroneous detection is less likely to occur according to the second phase detecting method as compared to the first phase detecting method. A step S6 decides whether or not the absolute phase is detected, and the process advances to he step S4 if the decision result in the step S6 is YES.

The step S4 compares the absolute phase detected by the first phase detecting method and the absolute phase detected by the second phase detecting method. A step S7 decides whether or not the compared absolute phases match. If the decision result in the step S7 is YES, a step S8 continues to use, as the absolute phase, the absolute phase which is detected by the first phase detecting method and is provisionally determined in the step S34, and the process advances to a step S10. On the other hand, if the decision result in the step S7 is NO, a step S9 corrects the absolute phase which is provisionally determined in the step S3 to the absolute phase which is detected by the second phase detecting method, and the process advances to the step S10. The step S10 finally determines the absolute phase based on the processes of the steps S8 and S9 described above and the process of a step S16 which will be described later.

A step S11 detects the absolute phase of the signal points of the received signal by the second phase detecting method, and a step S12 decides whether or not a reset instruction by a reset signal or the like is detected. If the decision result in the step S12 is YES, the process returns to the steps S1 and S5 to restart the absolute phase detecting process. The reset instruction is issued when the CPU 202 detects that the digital demodulator unit 12 is not operating normally, for example. On the other hand, if the decision result in the step S12 is NO, a step S13 decides whether or not the absolute phase is detected, and the process returns to the step S11 if the decision result in the step S13 is NO. If the decision result in the step S13 is YES, a step S14 compares the absolute phase detected in the step S11 and the absolute phase finally determined in the step S10, and a step S15 decides whether or not the absolute phases compared in the step S14 match. If the decision result in the step S15 is YES, the process returns to the step S11. On the other hand, if the decision result in the step S15 is NO, the step S16 corrects the absolute phase to the absolute phase detected by the second phase detecting method, and the process thereafter returns to the step S10.

In a case where the amount of noise included in the received signal is relatively small, it is possible to also accurately detect the absolute phase by the first phase detecting method, and thus, the absolute phases detected by the first and second phase detecting methods become the same. Accordingly, the absolute phase in this case is determined based on the detection result of the first phase detecting method, and it is possible to detect the absolute phase at a high speed.

On the other hand, even in a case where the amount of noise included in the received signal is relatively large, there are situations where the absolute phases detected by the first and second phase detecting methods become the same. In such situations, the absolute phase is determined based on the detection result of the first phase detecting method, so that the absolute phase can be detected at a high speed. In addition, if the detection results of the first and second phase detecting methods are mutually different, it is possible to determine the absolute phase based on the detection result of the second phase detecting method at the time when it is found that the detection results are mutually different, so that the absolute phase can be corrected at a high speed. In other words, since the absolute phase is once provisionally determined based on the detection result of the first phase detecting method, regardless of the amount of noise included in the received signal, it is possible to determine, as the absolute phase, the absolute phase which is provisionally determined based on the detection result of the first phase detecting method if the detection results of the first and second phase detecting methods are the same, so that the absolute phase can be detected at a high speed.

In addition, after the absolute phase is finally determined by the step S10, the phase may rotate due to the noise. However, this embodiment copes with such a rotation of the phase, by the steps S11 through S16. In other words, in a case where the phase rotates due to the noise, the amount of noise included in the received signal is large, and thus, measures are taken so that the absolute phase is detected by the second phase detecting method having the higher detection accuracy with respect to a change in the phase, unless the reset instruction is received.

Figure 1:
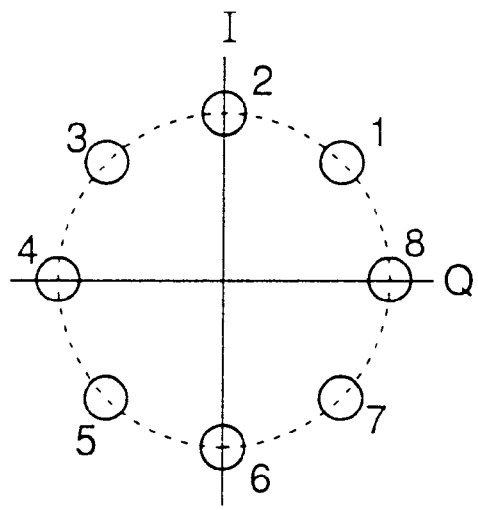
FIG. 1 is a diagram for explaining the detection of the absolute phase when demodulating a signal modulated by the 8PSK.
Figure 2:
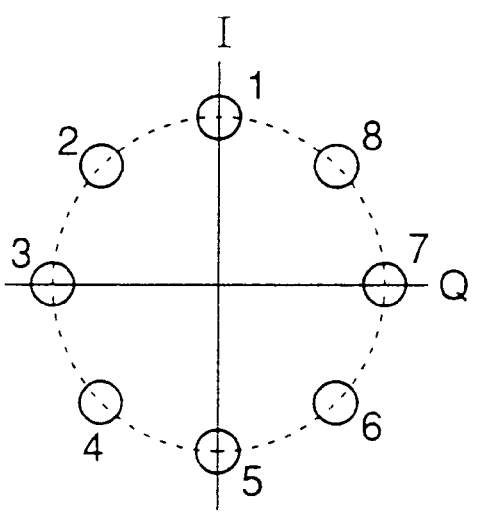
FIG. 2 is a diagram for explaining the detection of the absolute phase when demodulating a signal modulated by the 8PSK.
Figure 3:
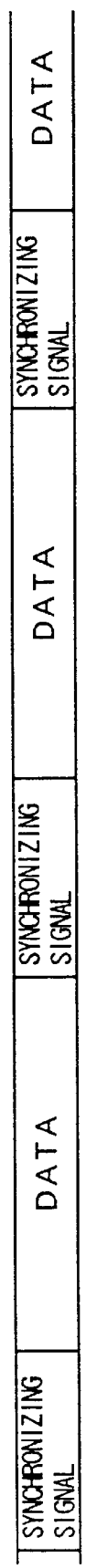
FIG. 3 is a diagram showing a format of a received signal.
Figure 8:
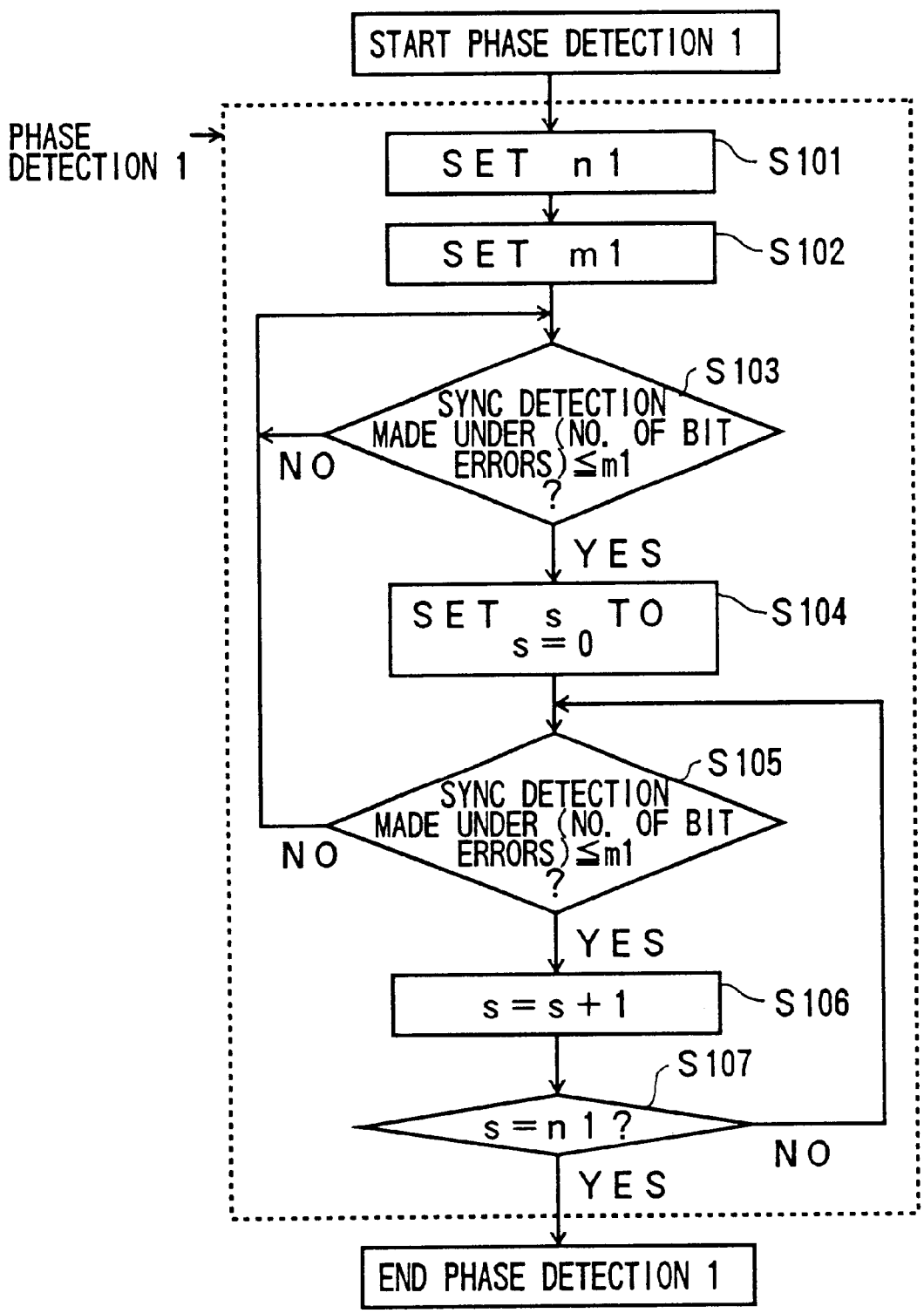
FIG. 8 is a flow chart showing a first embodiment of the process of a step S1 shown in FIG. 7.

FIG. 8 is a flow chart showing a first embodiment of the process of the step S1 shown in FIG. 7. In FIG. 8, when the step S1 is started, a step S101 sets a number n1, and a step S102 sets a number m1. The number n1 indicates a number of times the synchronizing signal within the received signal, such as that shown in FIG. 3, is consecutively received. The number m1 indicates a tolerable number of bit errors within the synchronizing signal. A step S103 decides whether or not a synchronization detection is made based on the synchronizing signal under a condition that the actual number of bit errors is less than or equal to the tolerable number m1. If the decision result in the step S103 is YES, a step S104 sets s to s=0, where s indicates the number of times the synchronizing signal is received. In addition, a step S105 decides whether or not a synchronization detection is made based on the synchronizing signal under a condition that the actual number of bit errors is less than or equal to the tolerable number m1. If the decision result in the step S103 or S105 is NO, the process returns to the step S103. On the other hand, if the decision result in the step S105 is YES, a step S106 increments the number s to s=s+1. A step S107 decides whether or not the number s is equal to the number n1. The process returns to the step S105 if the decision result in the step S107 is NO. The process ends if the decision result in the step S107 is YES.

For example, it is assumed for the sake of convenience that the number n1 of times the synchronizing signal is consecutively received is n1=2, the synchronizing signal has 8 bits with a pattern "10011010", and the tolerable number m1 of bit errors is m1=1. In this case, if a pattern of the received signal is "10111010", the third bit "1" should originally be a bit "0" in the case of the synchronizing signal, and the actual number of bit errors is 1. Hence, the actual number of bit errors in this case is less than or equal to the tolerable number m1 of bit errors, thereby making the decision result of the step S103 YES. In addition, if the pattern of the received signal is "10011000", the seventh bit "0" should originally be a bit "1" in the case of the synchronizing signal, and the actual number of bit errors is 1. Thus, the actual number of bit errors in this case is less than or equal to the tolerable number m1 of bit errors, thereby making the decision result of the step S105 YES. Furthermore, when the number s of times the synchronizing signal is received is incremented in the step S106 and becomes s=2, the decision result of the step S107 becomes YES, and the phase with which the synchronization is consecutively detected 2 times is detected as the absolute phase of the signal point of the received signal.

Therefore, according to this embodiment, the first phase detecting method detects the absolute phase by appropriately setting the number n1 of times the synchronizing signal is consecutively received, and judging the synchronization detection depending on the number of times the synchronizing signal is periodically received from an existing phase detecting range.

In addition, by appropriately setting the tolerable number m1 of bit errors, it becomes possible to receive the synchronizing signal even if an error of an arbitrary number of bits is generated in the synchronizing signal. In other words, since the synchronizing signal is normally made up of a plurality of bits, the detection of the synchronizing signal becomes difficult as the amount of noise becomes large. However, in a case where the synchronizing signal is made up of 8 bits, for example, this embodiment enables detection of the synchronizing signal by tolerating the generation of an error in 1 bit among the 8 bits. For this reason, it becomes possible to detect the synchronizing signal even when the amount of noise is large, and the absolute phase of the signal points of the received signal can be detected at a high speed.

Figure 9:
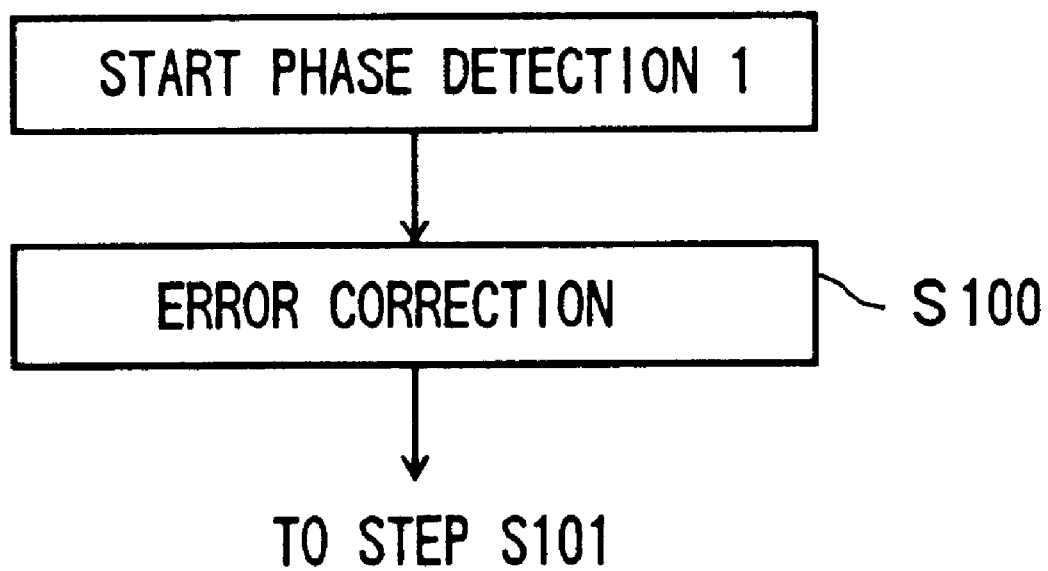
FIG. 9 is a flow chart showing a modification of the first embodiment of the process of the step S1 shown in FIG. 7.

FIG. 9 is a flow chart showing a modification of the first embodiment shown in FIG. 8 of the process of the step S1 shown in FIG. 7. In FIG. 9, when the step S1 is started, a step S100 carries out an error correction process with respect to the received signal, and the process advances to the step S101. Thereafter, the process is carried out similarly to that shown in FIG. 8. In this modification, the error correction process is carried out with respect to the received signal before detecting the absolute phase by the first phase detecting method. Consequently, it is possible to improve the detection accuracy of the absolute phase detected by the first phase detecting method which has a high detection speed.

Figure 10:
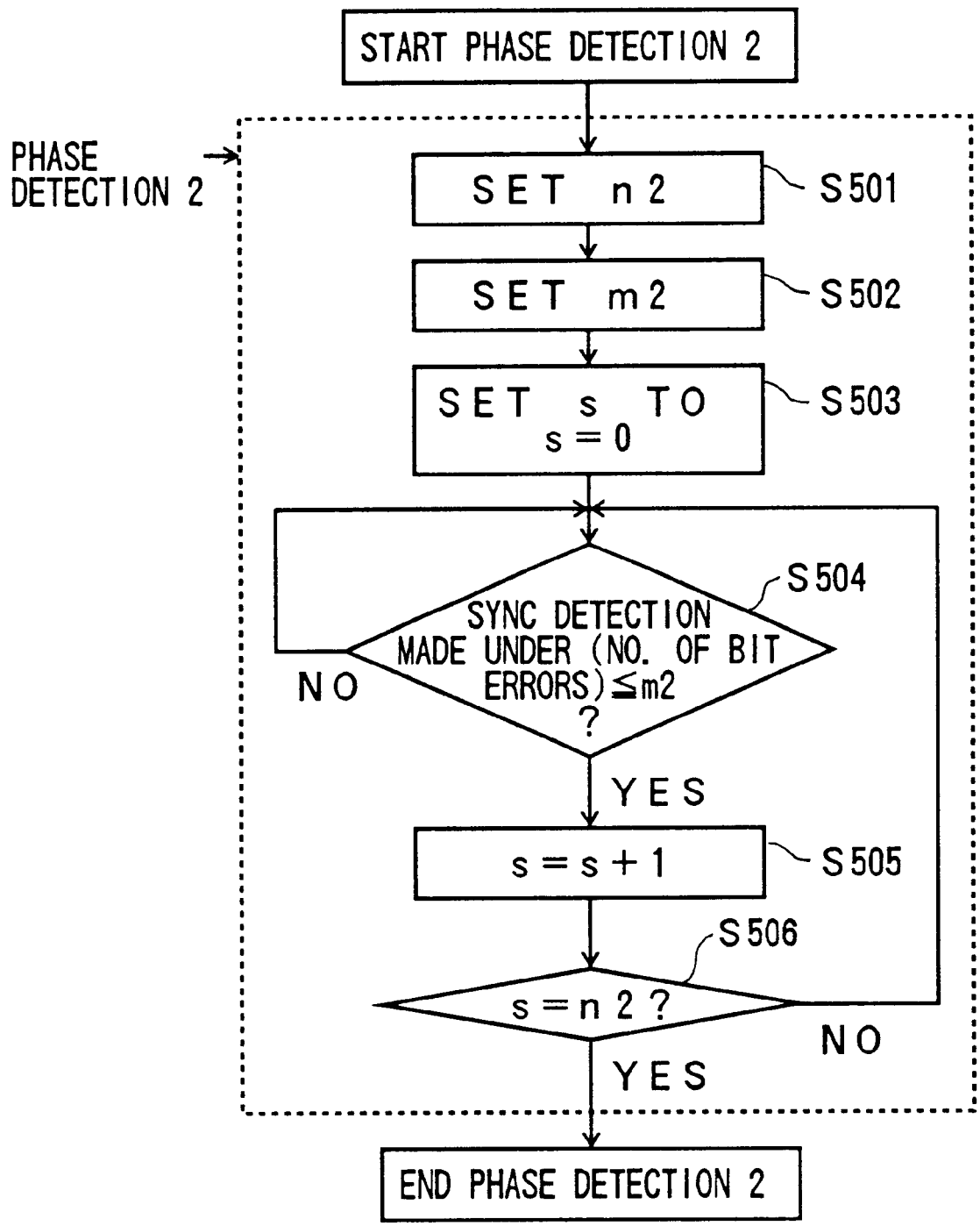
FIG. 10 is a flow chart showing a first embodiment of the process of a step S5 shown in FIG. 7.

FIG. 10 is a flow chart showing a first embodiment of the process of the step S5 shown in FIG. 7. In FIG. 10, when the step S5 is started, a step S501 sets a threshold n2 of the number of times the synchronizing signal within the received signal, such as that shown in FIG. 3, is received. A step S502 sets a tolerable number m2 of bit errors within the synchronizing signal. A step S503 sets the number s of times the synchronizing signal is received to s=0. A step S504 decides whether or not a synchronization detection is made based on the synchronizing signal under the condition that the actual number of bit errors is less than or equal to the tolerable number m2 of bit errors. The step S504 is repeated if the decision result in the step S504 is NO. On the other hand, if the decision result in the step S504 is YES, a step S505 increments the number s of times the synchronizing signal is received to s=s+1. A step S506 decides whether or not the number s of times the synchronizing signal is received is equal to the threshold n2. The process returns to the step S504 if the decision result in the step S506 is NO. On the other hand, the process ends if the decision result in the step S506 is YES.

For example, it is assumed for the sake of convenience that the threshold n2 of the number of times the synchronizing signal is received is n2=10000, the synchronizing signal has 8 bits with a pattern "10011010", and the tolerable number m2 of bit errors is m2=1. In this case, if a pattern of the received signal is "10011000", the seventh bit "0" should originally be a bit "1" in the case of the synchronizing signal, and the actual number of bit errors is 1. Hence, the actual number of bit errors in this case is less than or equal to the tolerable number m2 of bit errors, thereby making the decision result of the step S504 YES. In addition, if the number s of times the synchronizing signal is received is incremented in the step S505 and becomes s=10000, the decision result of the step S506 becomes YES, and the phase with which the synchronization is detected 10000 times in accumulation is detected as the absolute phase of the signal point of the received signal.

Therefore, according to this embodiment, the second phase detecting method detects the absolute phase by appropriately setting the threshold n2 of the number of times the synchronizing signal is received, and judging the synchronization detection depending on the accumulation of the number of times the synchronizing signal is periodically received from an existing phase detecting range. For example, in a case where the received signal is modulated by the 8PSK, the phase can take the positions of the data 1 through 8 shown in FIG. 11, and 8 kinds of phases can exist. However, this embodiment can accurately detect the absolute phase by detecting a phase with which the synchronizing signal is most received by accumulating the number of times the synchronizing signal is received with that phase. Since the noise is mixed about the centers of the 8 points of the data 1 through 8 shown in FIG. 11, it is possible to detect the phase with which the synchronizing signal is most received from a distribution of the received synchronizing signals by detecting the synchronizing signal for each phase, and the absolute phase can be detected based on the detected phase.

In addition, by appropriately setting the tolerable number m2 of bit errors, it becomes possible to receive the synchronizing signal even if an error of an arbitrary number of bits is generated in the synchronizing signal. In other words, since the synchronizing signal is normally made up of a plurality of bits, the detection of the synchronizing signal becomes difficult as the amount of noise becomes large. However, in a case where the synchronizing signal is made up of 8 bits, for example, this embodiment enables detection of the synchronizing signal by tolerating the generation of an error in 1 bit among the 8 bits. For this reason, it becomes possible to detect the synchronizing signal even when the amount of noise is large, and the absolute phase of the signal points of the received signal can be detected at a high speed.

Figure 12:
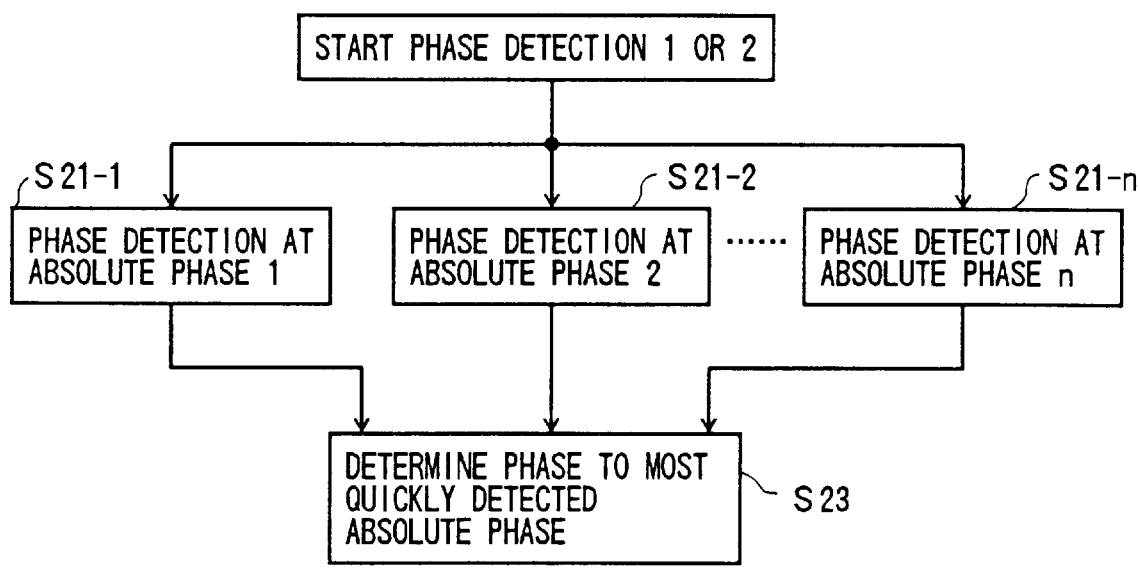
FIG. 12 is a flow chart showing a second embodiment of the processes of the steps S1 and S5 shown in FIG. 7.

FIG. 12 is a flow chart showing a second embodiment of the processes of the steps S1 and S5 shown in FIG. 7. In this embodiment, the absolute phase detecting processes are carried out in parallel with respect to the existing phase detecting range.

In FIG. 12, steps S21-1 through S21-n detect the absolute phases in parallel with respect to the corresponding phase detecting ranges. In the case of the process of the step S1, each step S21-i detects the absolute phase by the process described above in conjunction with FIG. 8, where i=1 to n. On the other hand, in the case of the process of the step S5, each step S21-i detects the absolute phase by the process described above in conjunction with FIG. 10, where i=1 to n. A step S23 determines, as the absolute phase, the absolute phase which is detected most quickly among the absolute phases detected by the steps S21-1 through S21-n.

In the case where the received signal is modulated by the 8PSK, n=8 and 8 kinds of phases exist. In this case, the steps S21-1 through S21-8 of this embodiment detect the absolute phases in parallel with respect to the corresponding phase detecting ranges. For this reason, it is possible to detect the absolute phase at a high speed. When carrying out the processes of the steps S21-1 through S21-8 by hardware, 8 phase detector parts are operated in parallel.

Figure 13:
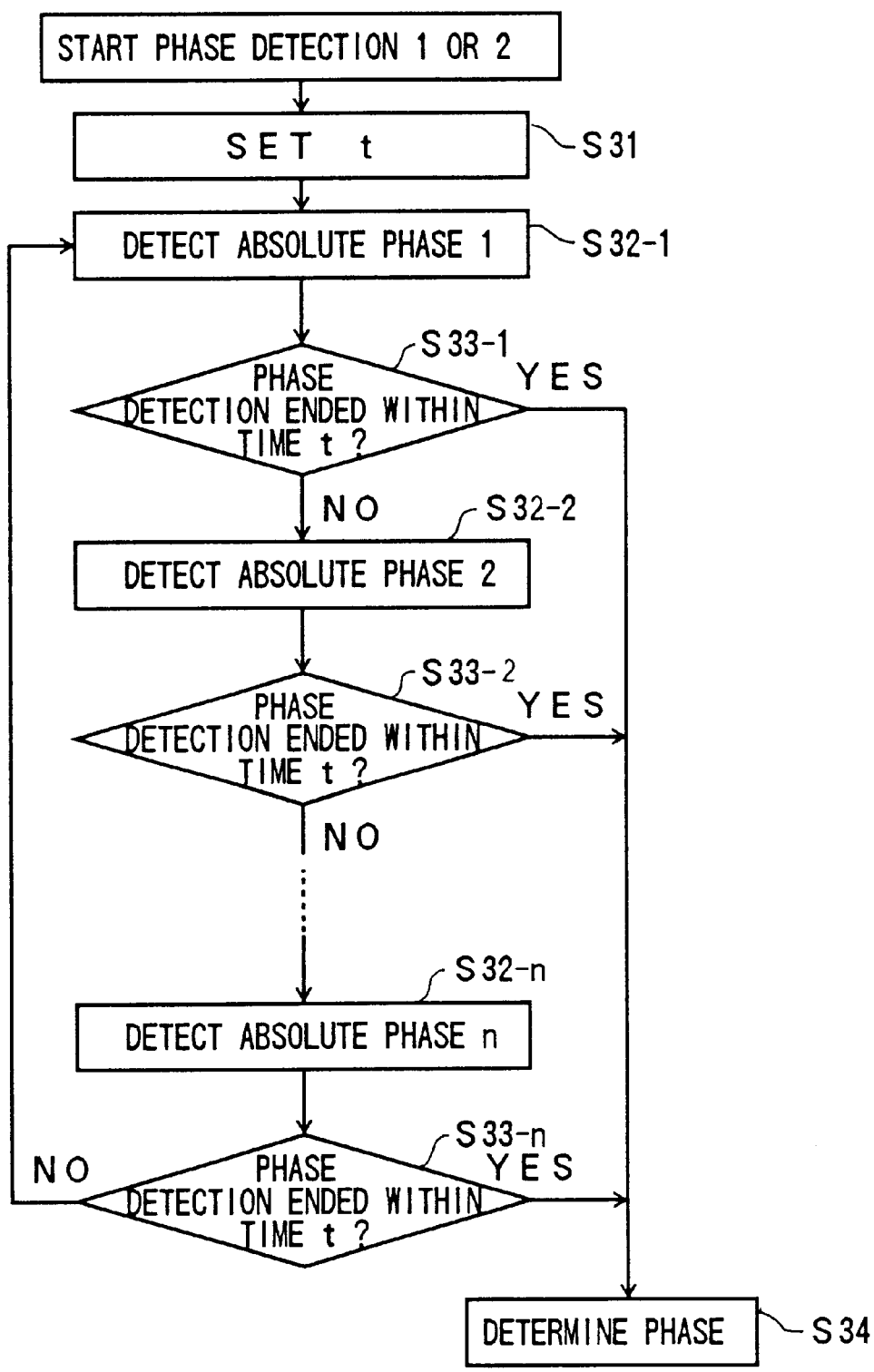
FIG. 13 is a flow chart showing a third embodiment of the processes of the steps S1 and S5 shown in FIG. 7.

FIG. 13 is a flow chart showing a third embodiment of the processes of the steps S1 and S5 shown in FIG. 7. In this embodiment, the absolute phase detecting process is successively carried out on a time base, with respect to the existing phase detecting range.

In FIG. 13, a step S31 sets a detection time t. A step S32-1 detects the absolute phase with respect to a corresponding phase detecting range. A step S33-1 decides whether or not the detection of the absolute phase by the step S32-1 ends within the time t, and a step S34 determines the absolute phase to the detected absolute phase if the decision result in the step S33-1 is YES. On the other hand, if the decision result in the step S33-1 is NO, a step S33-2 detects the absolute phase with respect to a corresponding phase detecting range. A step S33-3 decides whether or not the detection of the absolute phase by the step S33-2 ends within the time t, and the step S34 determines the absolute phase to the detected absolute phase if the decision result in the step S33-3 is YES. Similarly thereafter, if the decision result in a step S33-n–1 is NO, a step S32-n detects the absolute phase with respect to a corresponding phase detecting range. A step S33-n decides whether or not the detection of the absolute phase by the step S32-n ends within the time t, and the step S34 determines the absolute phase to the detected absolute phase if the decision result in the step S33-n is YES. In addition, the process returns to the step S32-1 if the decision result in the step S33-n is NO.

In the case where the received signal is modulated by the 8PSK, n=8 and 8 kinds of phases exist. In this case, the steps S32-1 through S33-8 of this embodiment successively detect the absolute phases with respect to the corresponding phase detecting ranges. For this reason, when carrying out the processes of the steps S32-1 through S33-8 by hardware, 1 phase detector part can be operated successively with respect to each of the phase detecting ranges, and the scale of the hardware can be reduced.

Next, a description will be given of a fourth embodiment of the processes of the steps S1 and S5 shown in FIG. 7. In this embodiment, the absolute phase detection time is reduced by overlapping mutually adjacent phase detecting ranges which are used to detect the absolute phase by the first or second phase detecting method in the second and third embodiments described above.

Figure 11:
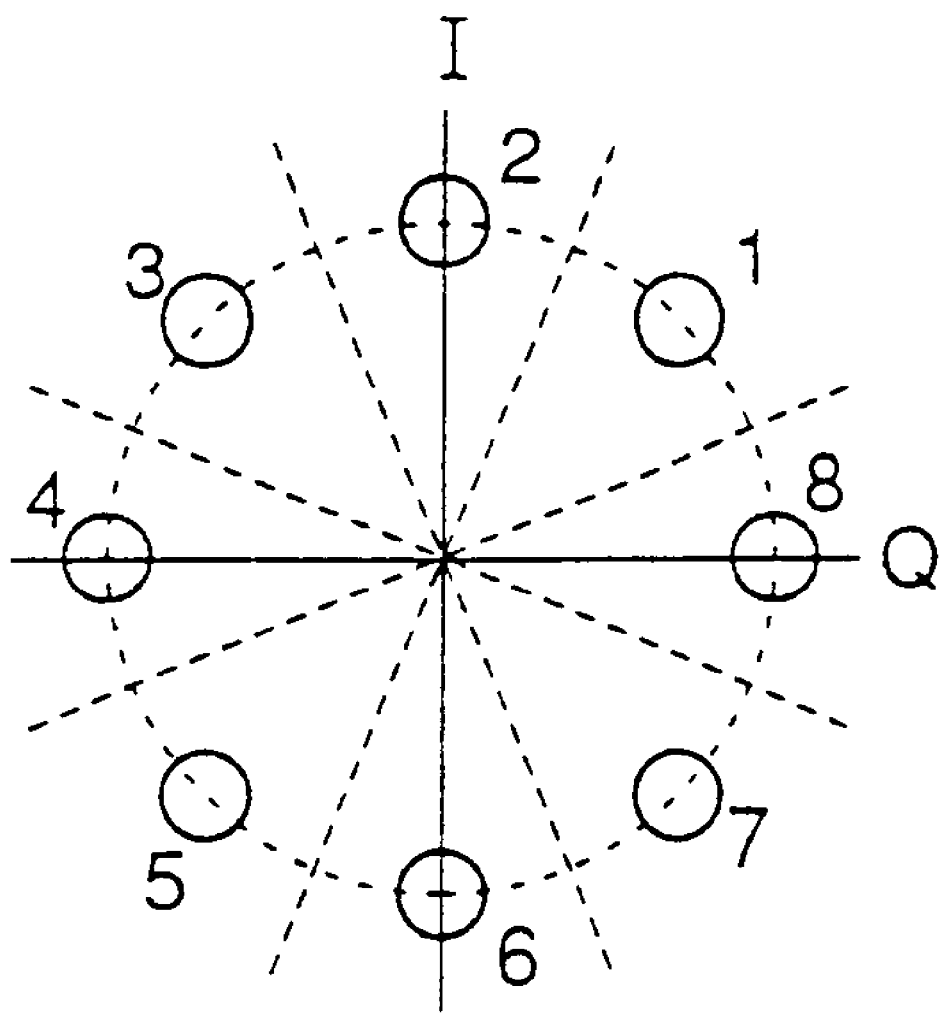
FIG. 11 is a diagram showing phases of a received signal modulated by the 8PSK.
Figure 14B:
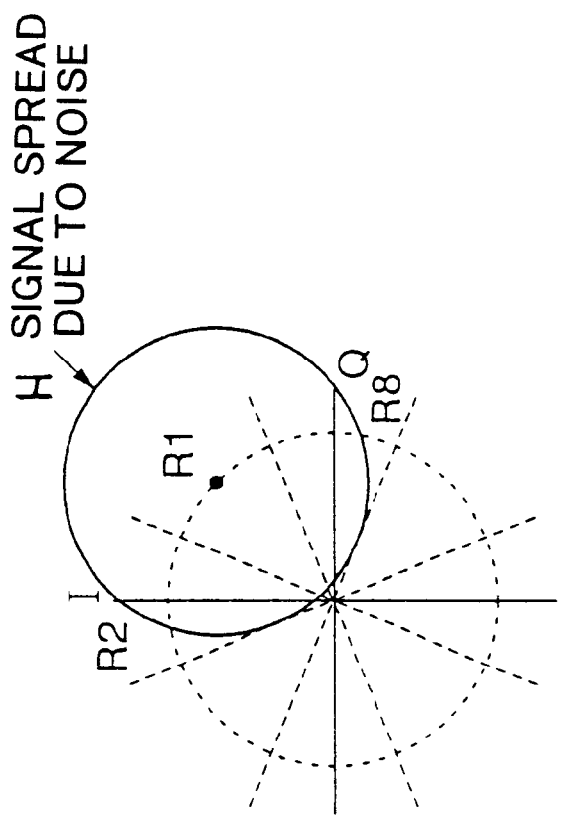
FIGS. 14A and 14B respectively are diagrams for explaining the effects of noise on the absolute phase detection.
Figure 14A:
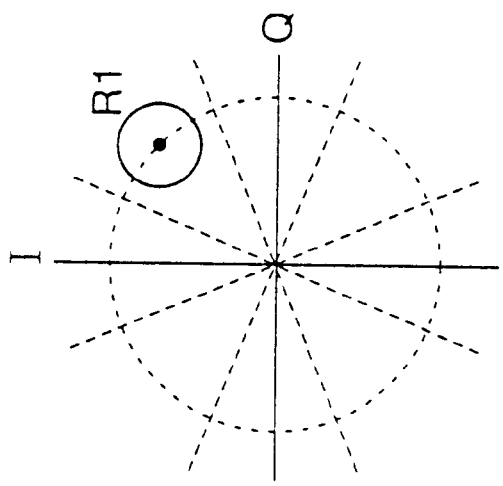

In the case where the received signal is modulated by the 8PSK, 8 kinds of phases exist as shown in FIG. 11. However, when the phase detecting range is equally divided into 8 phase detecting ranges and the amount of the noise included in the received signal increases, a difference between each phase detecting range and an adjacent phase detecting range becomes more difficult to see, and it takes time to detect the absolute phase. In other words, when the amount of noise is small, the data at a position indicated by a black dot in FIG. 14A will not go outside a phase detecting range R1, and the absolute phase can be detected at a high speed. But when the amount of noise is large, the signal spreads as indicated by H in FIG. 14B and goes outside the phase detecting range R1. In the case shown in FIG. 14B, the signal is also erroneously detected in adjacent phase detecting ranges R2 and R8, and it takes time to correctly detect the absolute phase.

Figure 15:
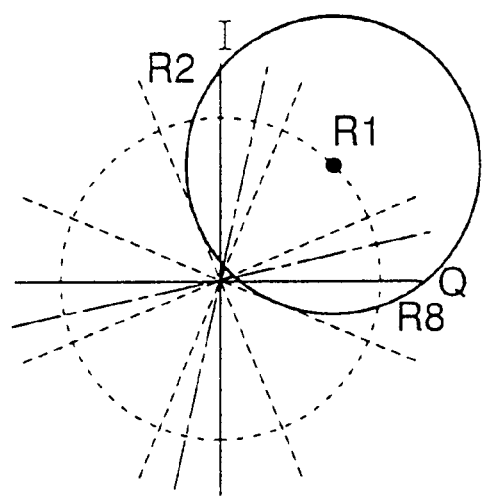
FIG. 15 is a diagram for explaining a fourth embodiment of the processes of the steps S1 and S5 shown in FIG. 7.

Accordingly, in this embodiment, the mutually adjacent phase detecting ranges which are used when detecting the absolute phase are arranged to overlap each other. More particularly, as shown in FIG. 15, the phase detecting range R1 is spread on one side so as to overlap the adjacent phase detecting range R2, and the phase detecting range R1 is spread on the other side so as to overlap the adjacent phase detecting range R8. As a result, the amount of signal detected within the phase detecting range R1 increases, and it becomes possible to accurately detect the signal existing within the phase detecting range R1 at a high speed. Each of the adjacent phase detecting ranges R2 and R8 are similarly spread to overlap the phase detecting ranges adjacent thereto. However, the increase in the amount of signal detected within the phase detecting ranges R2 and R8 by the spreading of the phase detecting ranges R2 and R8 is extremely small compared to the increase in the amount of signal detected within the phase detecting range R1 by the spreading of the phase detecting range R1, and consequently, it is possible to positively detect the signal existing within the phase detecting range R1.

Next, a description will be given of a fifth embodiment of the processes of the steps S1 and S5 shown in FIG. 7. In this embodiment, the absolute phase is detected by the first or second phase detecting method as in the first and second embodiments described above, even in a case where signals having different degrees of multi-value (degrees of modulation) coexist within the received signal. For example, the transmission itself of a modulated signal in which signals having different degrees of multi-value (degrees of modulation) coexist is discussed in Katoh et al., "A Study On Satellite ISDB Transmission System", Video Information Media Society Technical Report, Vol.21, No.25, pp.1–5, BSC97-12 (March 1997), and a description of such a transmission itself will be omitted in this specification.

Figure 16:
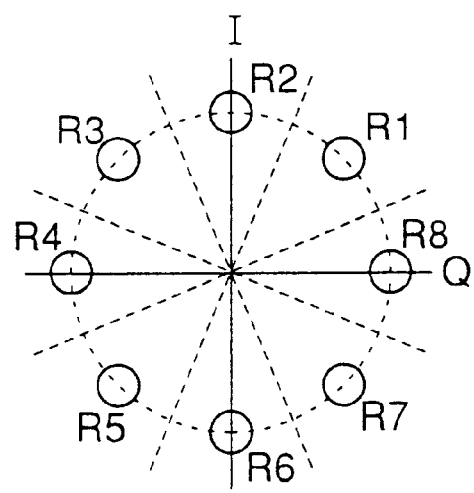
FIG. 16 is a diagram for explaining a fifth embodiment of the processes of the steps S1 and S5 shown in FIG. 7.

As an example of a case where signals having different degrees of multi-value (degrees of modulation) coexist within the received signal, there is a case where a signal modulated by the 8PSK and a signal modulated by the QPSK coexist within the received signal. In such a case, this embodiment adjusts the phase detecting range to the modulation technique having the higher degree of modulation, that is, to the 8PSK, so as to also cover the phase detecting range of the modulation technique having a lower degree of modulation. In other words, the absolute phase of the signal modulated by the 8PSK is detected using 8 kinds of phase detecting ranges R1 through R8 as shown in FIG. 16, and the absolute phase of the signal modulated by the QPSK is detected using 4 kinds of phase detecting ranges R1, R3, R5 and R7 or, using 4 kinds of phase detecting ranges R2, R4, R6 and R8, as shown in FIG. 16. As a result, the phase detecting ranges R1, R3, R5 and R7 or, the phase detecting ranges R2, R4, R6 and R8 of the QPSK having the lower degree of modulation than the 8PSK are covered by the phase detecting ranges R1 through R8 of the 8PSK having the higher degree of modulation.

Next, a description will be given of a sixth embodiment of the process of the step S1 shown in FIG. 7. In this embodiment, when a plurality of kinds of synchronizing signals exist within the received signal, the absolute phase of the signal points of the received signal is detected by the first phase detecting method, based on 1 kind of synchronizing signal or a plurality of kinds of synchronizing signals.

Figure 17:
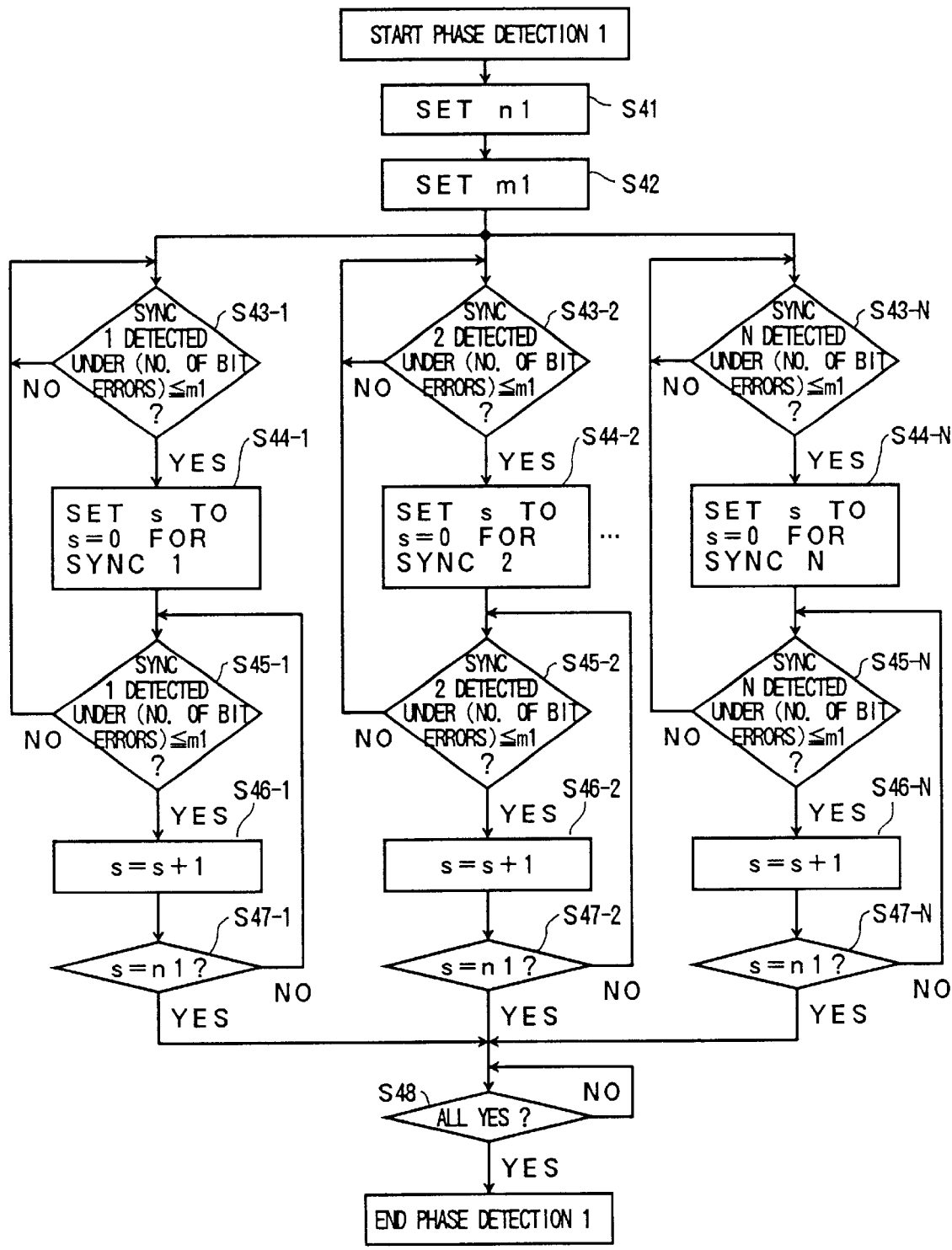
FIG. 17 is a flow chart showing a sixth embodiment of the process of the step S1 shown in FIG. 7.

FIG. 17 is a flow chart showing the sixth embodiment of the process of the step S1 shown in FIG. 7. In FIG. 17, when the step S1 is started, a step S41 sets a number n1 of times N kinds of synchronizing signals within the received signal are consecutively received, where N is an arbitrary integer. A step S42 sets a tolerable number m1 of bit errors within the synchronizing signal.

A step S43-i decides whether or not the synchronization is detected based on a synchronizing signal i under the condition that the actual number of bit errors is less than or equal to the tolerable number m1 of bit errors, where i=1 to N. If the decision result in the step S43-i is YES, a step S44-i sets a number s of times the synchronizing signal i is received to s=0. In addition, a step S45-i decides whether or not the synchronization is detected based on the synchronizing signal i under the condition that the actual number of bit errors is less than or equal to the tolerable number m1 of bit errors. If the decision result in the step S43-i or S45-i is NO, the process returns to the step S43-i. On the other hand, if the decision result in the step S45-i is YES, a step S46-i increments the number s of times the synchronizing signal i is received to s=s+1. A step S47-i decides whether or not the number s of times the synchronizing signal i is received is equal to the number n1 of times the synchronizing signal i is consecutively received. The process returns to the step S45-i if the decision result in the step S47-i is NO. If the decision result in the step S47-i is YES, the process advances to a step S48. The steps S43-i through S47-i are carried out in parallel, with respect to i=1 to N. The step S48 decides whether or not the decision result is YES for all of the steps S47-1 through S47-N, and the process ends if the decision result in the step S48 is YES.

The steps S41, S42, and S43-i through S47-i respectively correspond to the steps S101 through S107 described above in conjunction with FIG. 8.

Therefore, according to this embodiment, the first phase detecting method appropriately sets the number n1 of times the N kinds of synchronizing signals are consecutively received, and detects the absolute phase from the existing phase detecting range, by judging the synchronization detection from the number of times the b 1or N or less kinds of periodically received synchronizing signals are consecutively received.

In addition, by appropriately setting the tolerable number m1 of bit errors, it becomes possible to receive the 1 or N or less kinds of synchronizing signals even if an error of an arbitrary number of bits is generated in the 1 or N or less kinds of synchronizing signals. In other words, since the synchronizing signal is normally made up of a plurality of bits, the detection of the synchronizing signal becomes difficult as the amount of noise becomes large. However, in a case where the synchronizing signal is made up of 8 bits, for example, this embodiment enables detection of the synchronizing signal by tolerating the generation of an error in 1 bit among the 8 bits. For this reason, it becomes possible to detect the 1 or N or less kinds of synchronizing signals even when the amount of noise is large, and the absolute phase of the signal points of the received signal can be detected at a high speed.

In FIG. 17, it is possible to improve the detection speed of the absolute phase detection when N=1. On the other hand, although the detection speed of the absolute phase detection becomes slightly slower than that of the case where N=1, it is possible to improve the detection accuracy when N≧2. Accordingly, it is possible to arbitrarily select the value of N depending on the required performance of the receiving apparatus.

Furthermore, when the step S1 is started, it is possible to carry out an error correction process with respect to the received signal as in the step S100 shown in FIG. 9, before carrying out the step S41 shown in FIG. 17. In this case, because the error correction process is carried out with respect to the received signal before the absolute phase is detected by the first phase detecting method, it is possible to improve the detection accuracy of the absolute phase detection carried out by the first phase detecting method which has the high detection speed.

Next, a description will be given of a sixth embodiment of the process of the step S5 shown in FIG. 7. In this embodiment, when a plurality of kinds of synchronizing signals exist within the received signal, the absolute phase of the signal points of the received signal is detected by the second phase detecting method, based on 1 kind of synchronizing signal or a plurality of kinds of synchronizing signals.

Figure 18:
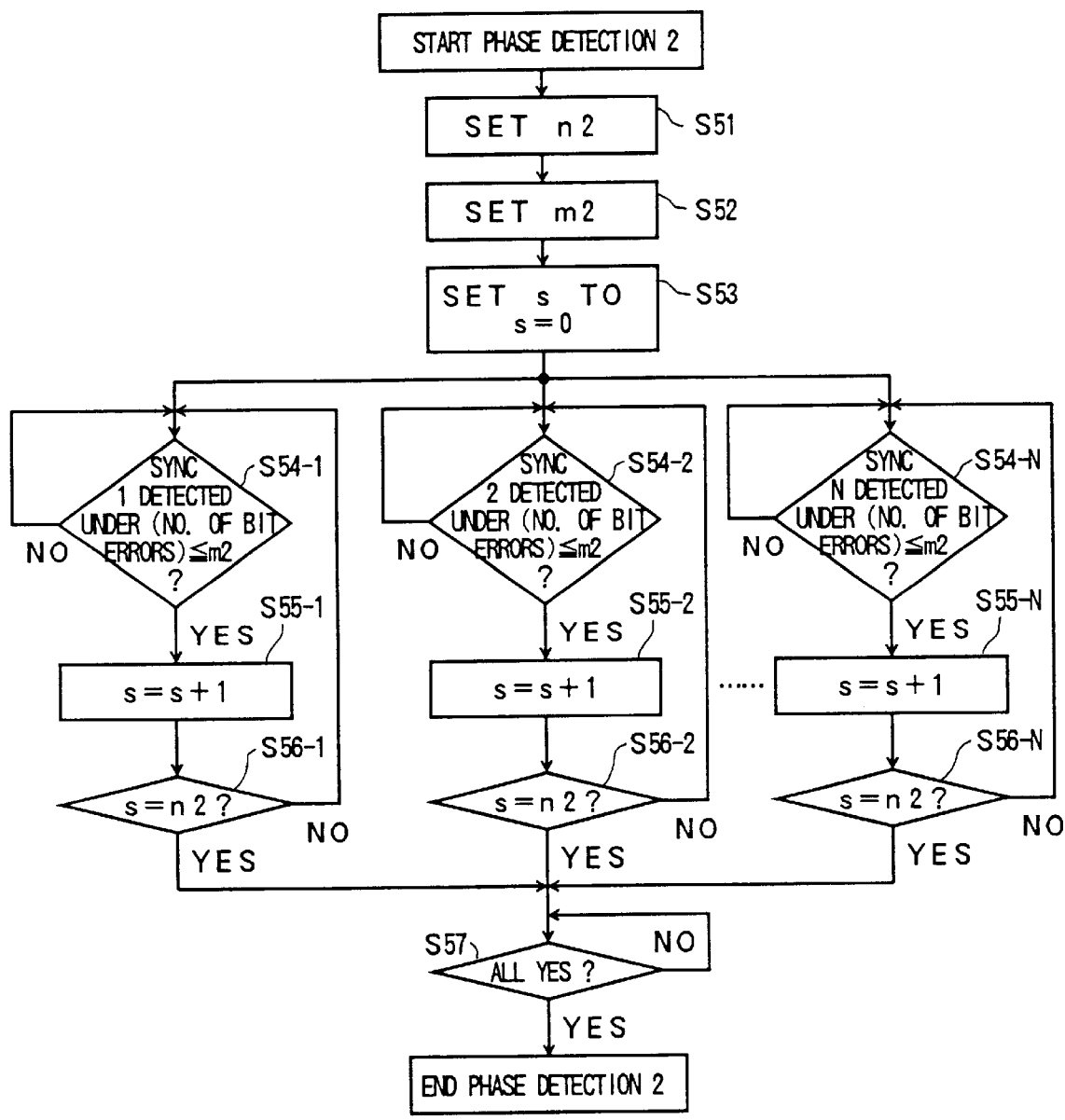
FIG. 18 is a flow chart showing a sixth embodiment of the process of the step S5 shown in FIG. 7.

FIG. 18 is a flow chart showing the sixth embodiment of the process of the step S5 shown in FIG. 7. In FIG. 18, when the step S5 is started, a step S51 sets a threshold n2 of the number of times N kinds of synchronizing signals within the received signal are received, where N is an arbitrary integer. A step S52 sets a tolerable number m2 of bit errors within the synchronizing signal. A step S53 sets a number s of times the synchronizing signal is received to s=0.

A step S54-i decides whether or not the synchronization is detected based on a synchronizing signal i under the condition that the actual number of bit errors is less than or equal to the tolerable number m2 of bit errors, where i=1 to N. The step S54-i is repeated if the decision result in the step S54-i is NO. On the other hand, if the decision result in the step S54-i is YES, a step S55-i increments the number s of times the synchronizing signal i is received to s=s+1. A step S56-i decides whether or not the number s of times the synchronizing signal i is received is equal to the threshold n2 of the number of times the synchronizing signal i is received. The process returns to the step S54-i if the decision result in the step S56-i is NO. If the decision result in the step S56-i is YES, the process advances to a step S57. The steps S54-i through S56-i are carried out in parallel, with respect to i=1 to N. The step S57 decides whether or not the decision result is YES for all of the steps S56-1 through S56-N, and the process ends if the decision result in the step S57 is YES.

The steps S51 through S53 and S54-i through S56-i respectively correspond to the steps S501 through S506 described above in conjunction with FIG. 10.

Therefore, according to this embodiment, the second phase detecting method appropriately sets the threshold n2 of the number of times the N kinds of synchronizing signals are received, and detects the absolute phase from the existing phase detecting range, by judging the synchronization detection from the accumulation of the number of times the 1 or N or less kinds of periodically received synchronizing signals are received.

In addition, by appropriately setting the tolerable number m2 of bit errors, it becomes possible to receive the 1 or N or less kinds of synchronizing signals even if an error of an arbitrary number of bits is generated in the 1 or N or less kinds of synchronizing signals. In other words, since the synchronizing signal is normally made up of a plurality of bits, the detection of the synchronizing signal becomes difficult as the amount of noise becomes large. However, in a case where the synchronizing signal is made up of 8 bits, for example, this embodiment enables detection of the synchronizing signal by tolerating the generation of an error in 1 bit among the 8 bits. For this reason, it becomes possible to detect the 1 or N or less kinds of synchronizing signals even when the amount of noise is large, and the absolute phase of the signal points of the received signal can be detected at a high speed.

In FIGS. 17 and 18, the number n1 of times the synchronizing signal is consecutively received, the tolerable number m1 of bit errors, the threshold n2 of the number of times the synchronizing signal is received, and the tolerable number m2 of bit errors are respectively set in common with respect to the N kinds of synchronizing signals. However, it is of course possible to independently set n1, m1, n2 and m2 for j kinds of synchronizing signals, where j≦N, and the same applies to the other embodiments described hereunder.

Next, a description will be given of a seventh embodiment of the process of the step S1 shown in FIG. 7. In this embodiment, when one or a plurality of kinds of synchronizing signals exist within the received signal, the absolute phase of the signal points of the received signal is detected by the first phase detecting method by independently providing protection stages for the synchronization detection in synchronizing signal parts of the one or plurality of synchronizing signals.

Figure 19:
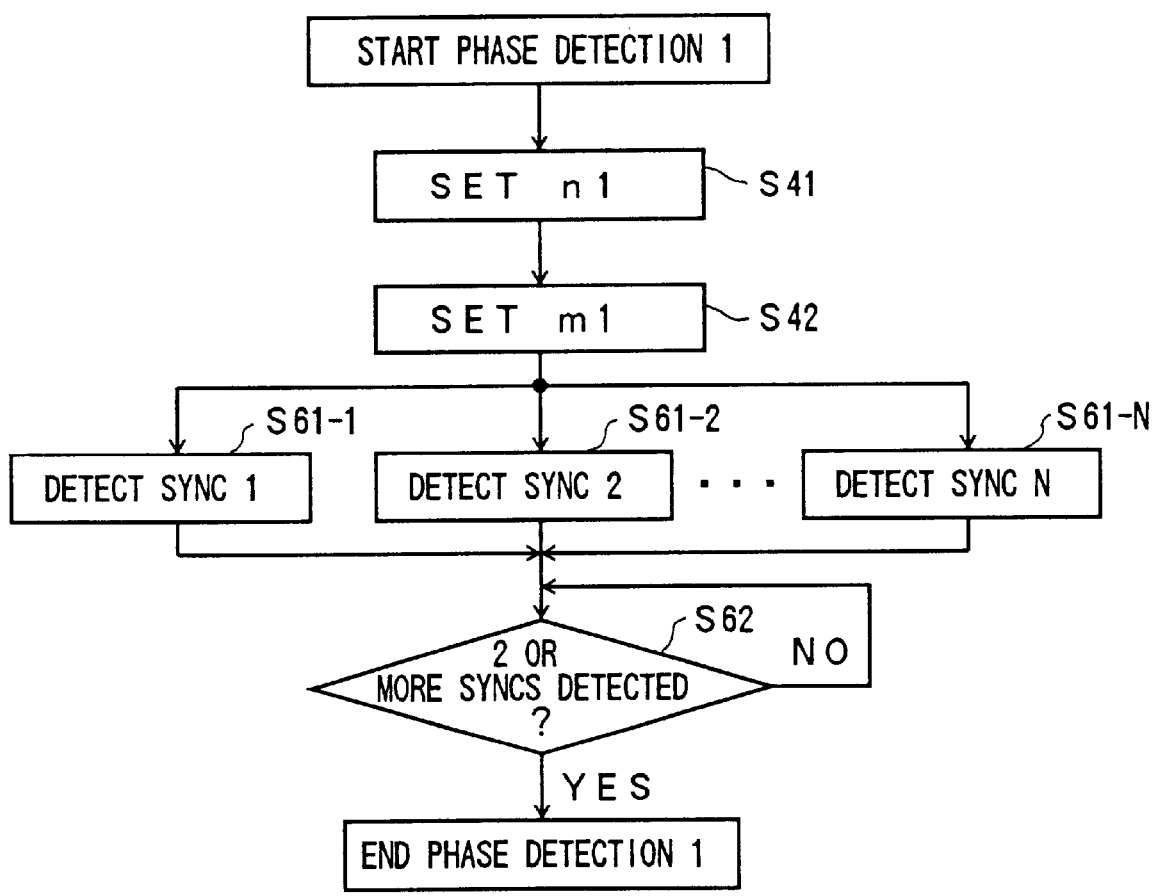
FIG. 19 is a flow chart showing a seventh embodiment of the process of the step S1 shown in FIG. 7.
Figure 20:
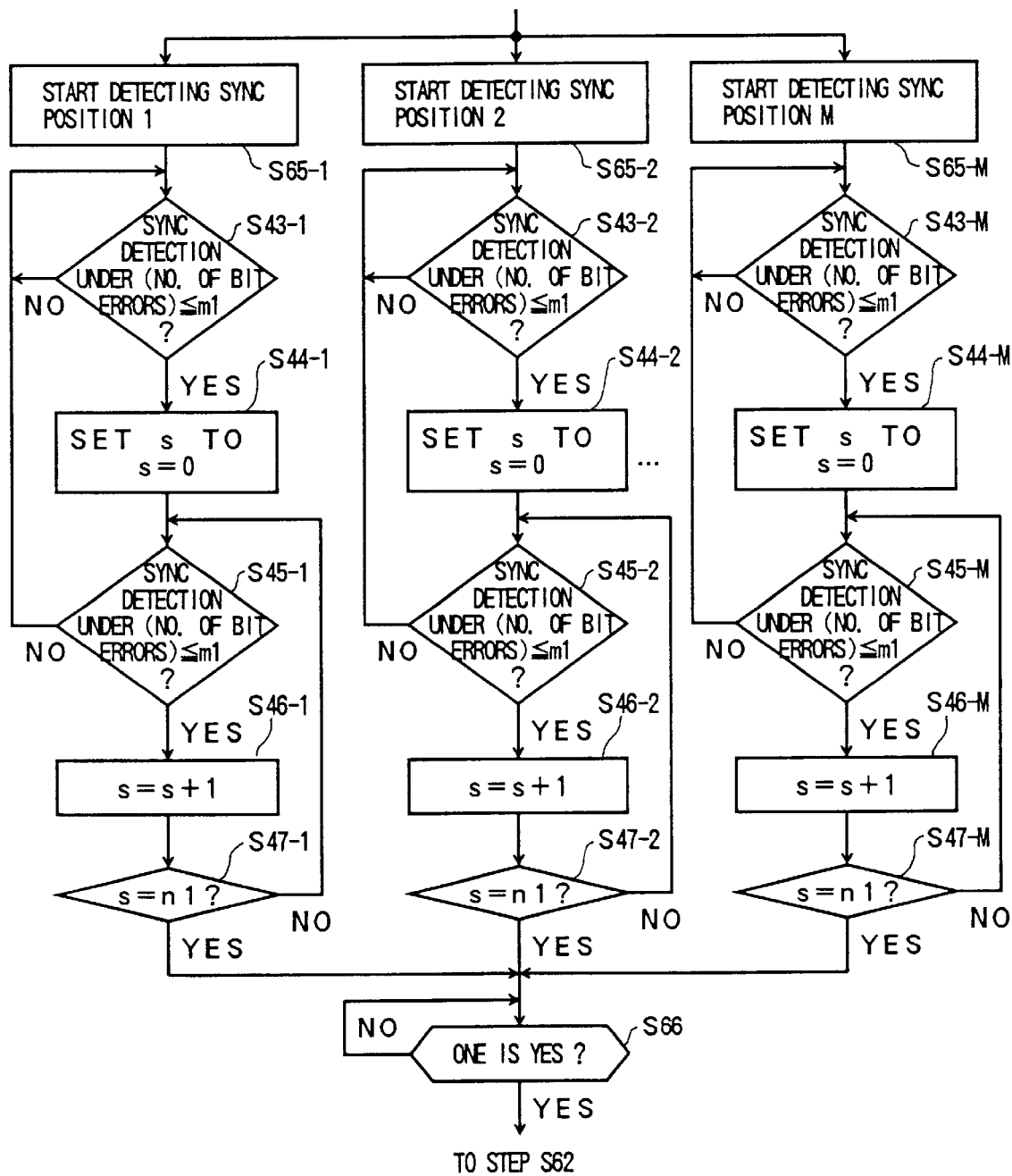
FIG. 20 is a flow chart showing the details of a step S61-i shown in FIG. 19.

FIG. 19 is a flow chart showing the seventh embodiment of the process of the step S1 shown in FIG. 7, and FIG. 20 is a flow chart showing the details of a step S61-i shown in FIG. 19, where i=1 to N. In FIGS. 19 and 20, those steps which are the same as those corresponding steps in FIG. 17 are designated by the same reference numerals, and a description thereof will be omitted.

In FIG. 19, when the step S1 is started and the steps S41 and S42 are carried out, steps S61-1 through S61-N are then carried out in parallel. In this embodiment, a step S61-i detects a corresponding synchronizing signal i from among the N kinds of synchronizing signals, where i=1 to N. When a corresponding kind of synchronizing signal is detected in one of the steps S61-1 through S61-N, a step S62 decides whether or not two or more kinds of synchronizing signals are detected, and the process ends if the decision result in the step S62 becomes YES.

Each step S61-i carries out the process shown in FIG. 20 with respect to the corresponding kind of synchronizing signal i. Steps S65-1 through S65-M are carried out in parallel, where M is an arbitrary integer. A step S65-j starts a process of detecting a synchronizing signal position (part) j of the corresponding kind of synchronizing signal i, where j=1 to M. If the decision result in a step S47-j becomes YES, a step S66 decides whether or not the decision result is YES in one of the steps S47-1 through S47-M. The process advances to the step S62 shown in FIG. 19 if the decision result in the step S66 becomes YES.

Figure 21:
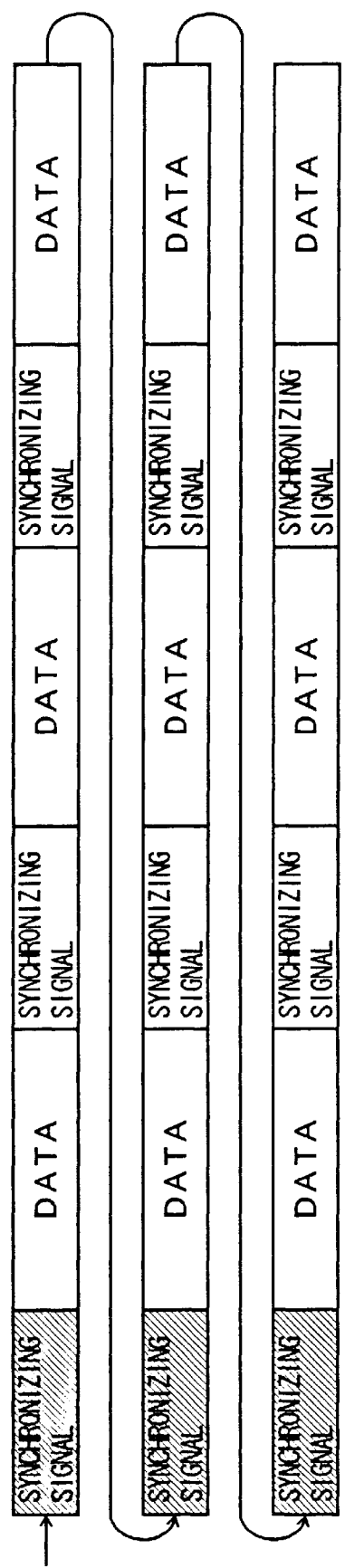
FIG. 21 is a diagram for explaining the detection of the absolute phase when there is 1 kind of synchronizing signal.

Accordingly, if the number of kinds of synchronizing signals is 1 and N=1, and the number of protection stages is 3 and M=3, it is regarded that the synchronization is detected when the synchronizing signal is consecutively detected n1 times at one of a first synchronizing signal position 1, a second synchronizing signal position 2 and a third synchronizing signal position 3, as indicated by the hatching in FIG. 21. For this reason, compared to the case where the synchronization is not detected unless the synchronizing signal is consecutively detected n1 times at all of the synchronizing signal positions, it is possible to detect the absolute phase even if there exists a synchronizing signal position where the synchronizing signal is not consecutively detected n1 times due to noise.

Figure 22:
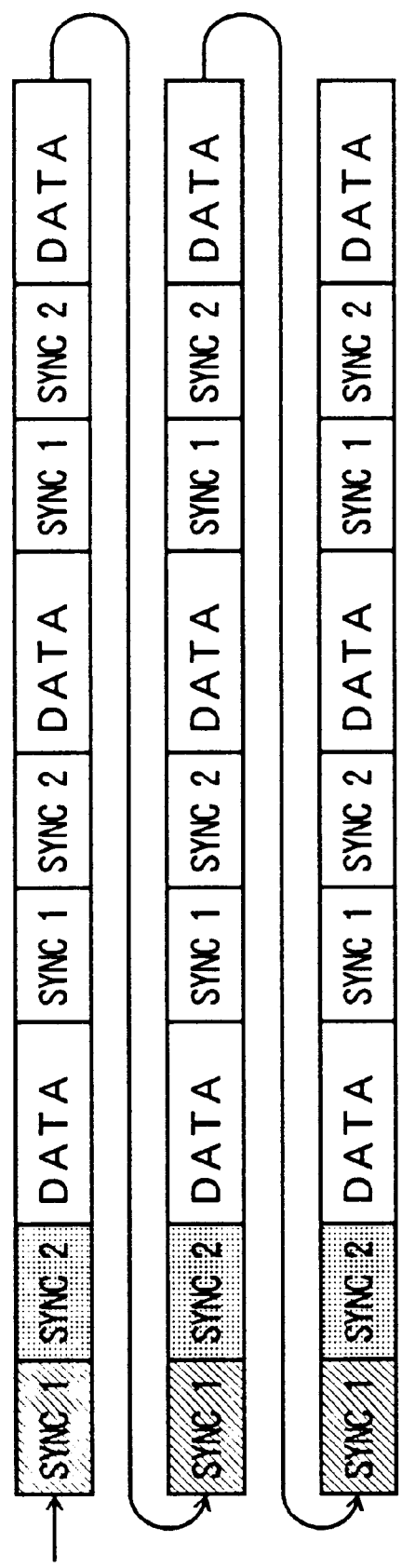
FIG. 22 is a diagram for explaining the detection of the absolute phase when there are 2 kinds of synchronizing signals.

In addition, if the number of kinds of synchronizing signals is 2 and N=2, and the number of protection stages is 3 and M=3, it is regarded that the synchronization is detected when a first kind of synchronizing signal is consecutively detected n1 times at one of a first synchronizing signal position 1, a second synchronizing signal position 2 and a third synchronizing signal position 3, as indicated by the hatching in FIG. 22, and a second kind of synchronizing signal is consecutively detected n1 times at one of a first synchronizing signal position 1, a second synchronizing signal position 2 and a third synchronizing signal position 3, as indicated by the shading in FIG. 22. For this reason, compared to the case where the synchronization is not detected unless the 2 kinds of synchronizing signals are consecutively detected n1 times at all of the synchronizing signal positions, it is possible to detect the absolute phase even if there exists a synchronizing signal position where the first and synchronizing signal are not consecutively detected n1 times due to noise. Furthermore, even if a pattern accidentally identical to that of the synchronizing signal is generated in the data part, it is possible to positively prevent such a data pattern from being erroneously detected as the synchronizing signal and thus prevent an erroneous synchronization detection.

Next, a description will be given of a seventh embodiment of the process of the step S5 shown in FIG. 7. In this embodiment, when one or a plurality of kinds of synchronizing signals exist within the received signal, the absolute phase of the signal points of the received signal is detected by the second phase detecting method by independently providing protection stages for the synchronization detection in synchronizing signal parts of the one or plurality of synchronizing signals.

Figure 23:
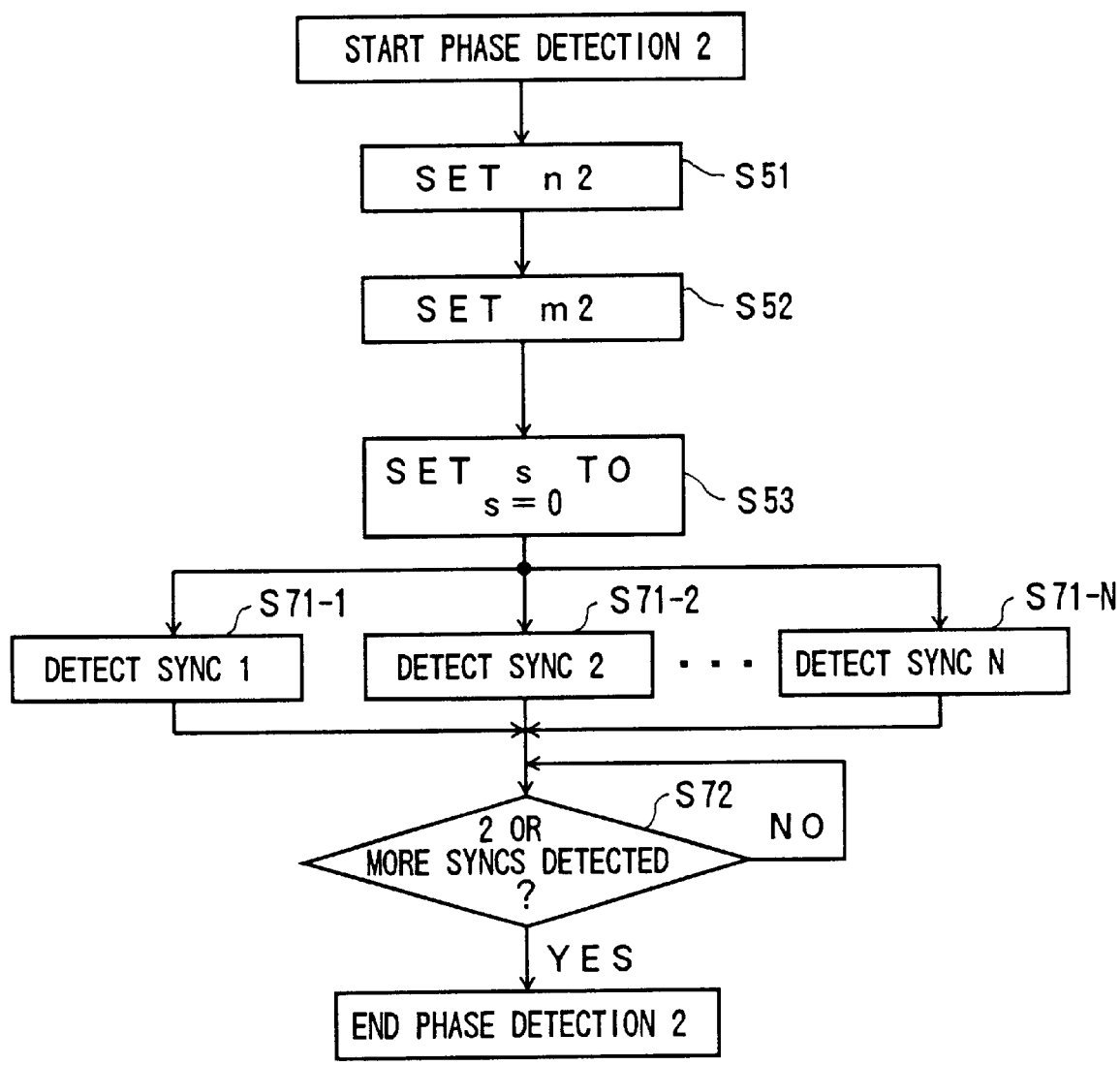
FIG. 23 is a flow chart showing a seventh embodiment of the process of the step S5 shown in FIG. 7.
Figure 24:
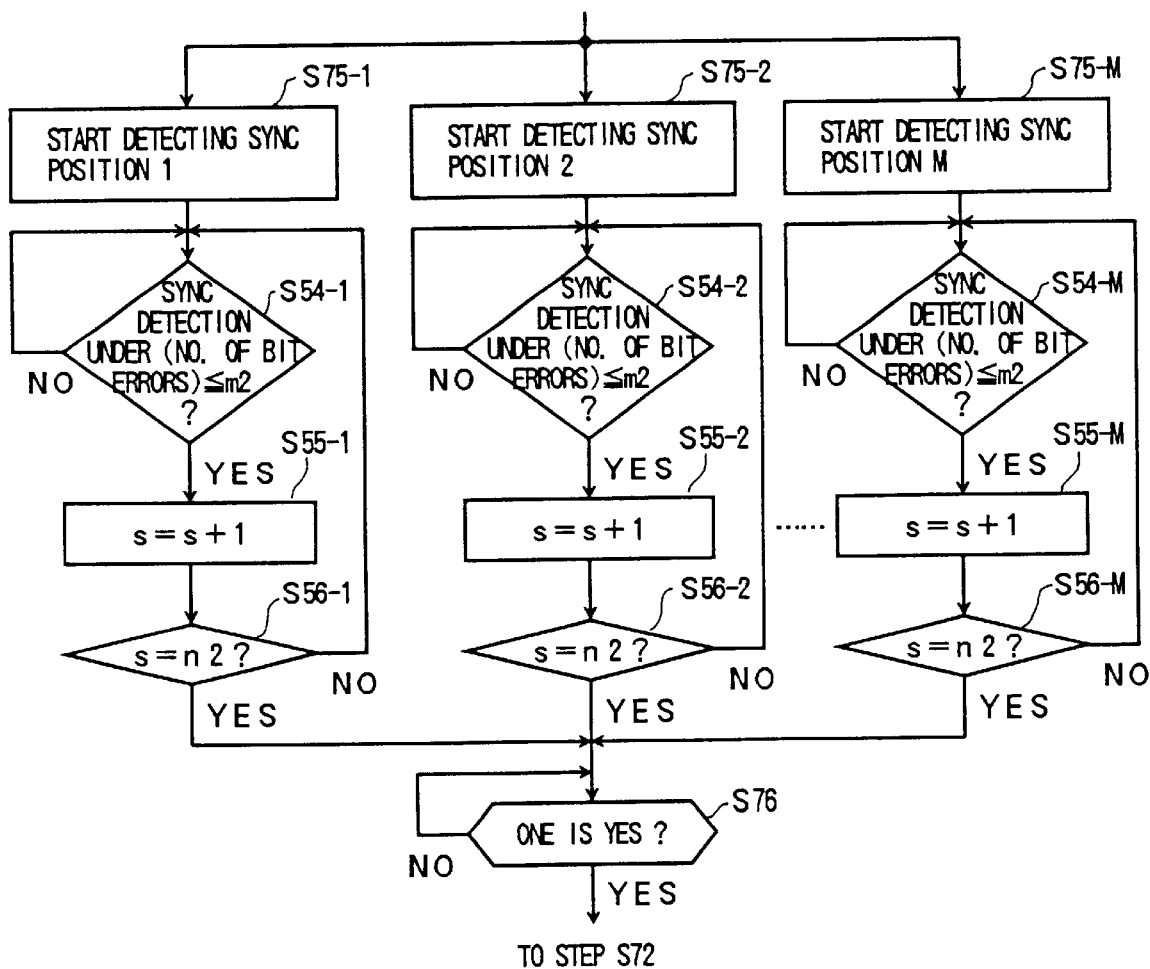
FIG. 24 is a flow chart showing the details of a step S71-i shown in FIG. 23.

FIG. 23 is a flow chart showing the seventh embodiment of the process of the step S5 shown in FIG. 7, and FIG. 24 is a flow chart showing the details of a step S71-i shown in FIG. 23, where i=1 to N. In FIGS. 23 and 24, those steps which are the same as those corresponding steps in FIG. 18 are designated by the same reference numerals, and a description thereof will be omitted.

In FIG. 23, when the step S5 is started and the steps S51 through S53 are carried out, steps S71-1 through S71-N are then carried out in parallel. In this embodiment, a step S71-i detects a corresponding synchronizing signal i from among the N kinds of synchronizing signals, where i=1 to N. When a corresponding kind of synchronizing signal is detected in one of the steps S71-1 through S71-N, a step S72 decides whether or not two or more kinds of synchronizing signals are detected, and the process ends if the decision result in the step S72 becomes YES.

Each step S71-i carries out the process shown in FIG. 24 with respect to the corresponding kind of synchronizing signal i. Steps S75-1 through S75-M are carried out in parallel, where M is an arbitrary integer. A step S75-j starts a process of detecting a synchronizing signal position (part) j of the corresponding kind of synchronizing signal i, where j=1 to M. If the decision result in a step S56-j becomes YES, a step S76 decides whether or not the decision result is YES in one of the steps S56-1 through S56-M. The process advances to the step S72 shown in FIG. 23 if the decision result in the step S76 becomes YES.

Accordingly, if the number of kinds of synchronizing signals is 1 and N=1, and the number of protection stages is 3 and M=3, it is regarded that the synchronization is detected when the synchronizing signal is detected n2 times at one of a first synchronizing signal position 1, a second synchronizing signal position 2 and a third synchronizing signal position 3, as indicated by the hatching in FIG. 21. For this reason, compared to the case where the synchronization is not detected unless the synchronizing signal is detected n2 times at all of the synchronizing signal positions, it is possible to detect the absolute phase even if there exists a synchronizing signal position where the synchronizing signal is not detected n2 times due to noise.

In addition, if the number of kinds of synchronizing signals is 2 and N=2, and the number of protection stages is 3 and M=3, it is regarded that the synchronization is detected when a first kind of synchronizing signal is detected n2 times at one of a first synchronizing signal position 1, a second synchronizing signal position 2 and a third synchronizing signal position 3, as indicated by the hatching in FIG. 22, and a second kind of synchronizing signal is detected n2 times at one of a first synchronizing signal position 1, a second synchronizing signal position 2 and a third synchronizing signal position 3, as indicated by the shading in FIG. 22. For this reason, compared to the case where the synchronization is not detected unless the 2 kinds of synchronizing signals are detected n2 times at all of the synchronizing signal positions, it is possible to detect the absolute phase even if there exists a synchronizing signal position where the first and synchronizing signal are not detected n2 times due to noise. Furthermore, even if a pattern accidentally identical to that of the synchronizing signal is generated in the data part, it is possible to positively prevent such a data pattern from being erroneously detected as the synchronizing signal and thus prevent an erroneous synchronization detection.

Next, a description will be given of an eighth embodiment of the process of the step S1 shown in FIG. 7. In this embodiment, when one or a plurality of kinds of synchronizing signals exist within the received signal, the absolute phase of the signal points of the received signal is detected by the first phase detecting method by independently providing protection stages for the synchronization error detection in synchronizing signal parts of the one or plurality of synchronizing signals.

Figure 25:
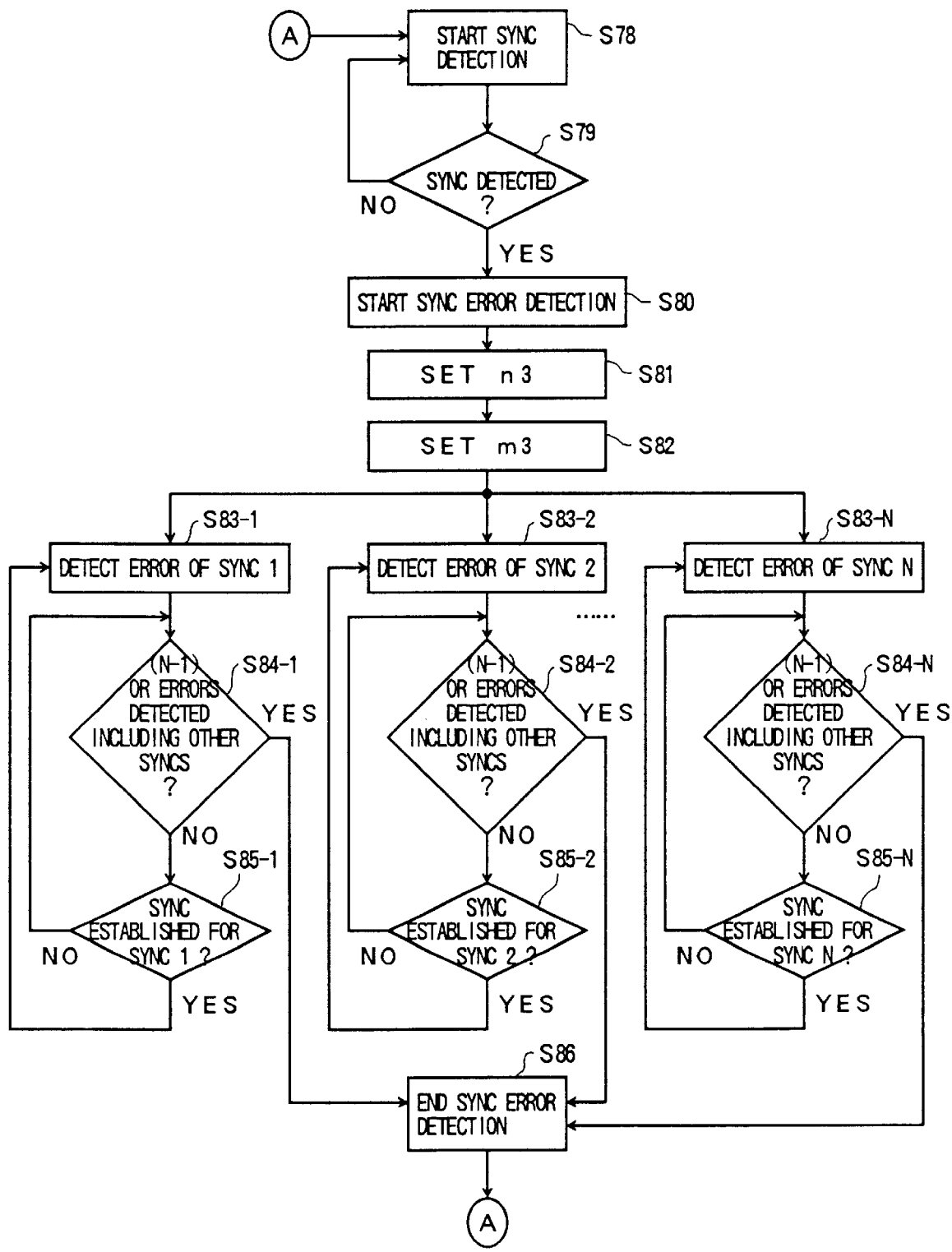
FIG. 25 is a flow chart showing an eighth embodiment of the process of the step S1 shown in FIG. 7.
Figure 26:
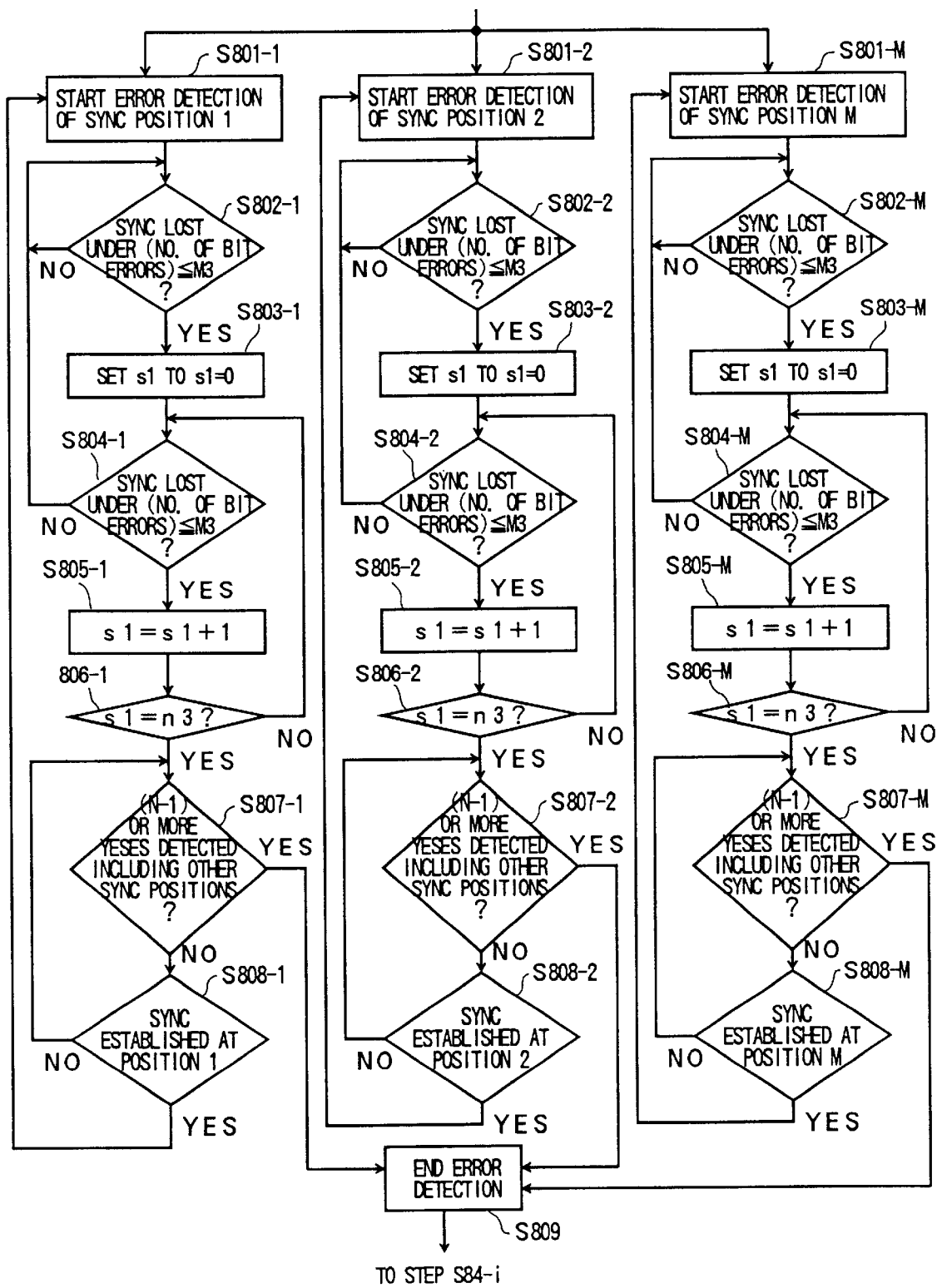
FIG. 26 is a flow chart showing the details of a step S83-i shown in FIG. 25.

FIG. 25 is a flow chart showing the eighth embodiment of the process of the step S1 shown in FIG. 7, and FIG. 26 is a flow chart showing the details of a step S83-i shown in FIG. 25, where i=1 to N.

In FIG. 25, when the step S1 is started, a step S78 starts a synchronization detection process, and a step S79 decides whether or not the synchronization detection was successful. The process returns to the step S78 if the decision result in the step S79 is NO. On the other hand, the process advances to a step S80 if the decision result in the step S79 is YES. For example, the steps S78 and S79 may carry out the synchronization detection by the process shown in FIG. 17 or FIG. 19 described above.

The step S80 starts a synchronization error detection process. A step S81 sets a number n3 of times the synchronizing signal is consecutively lost, and a step S82 sets a tolerable number m3 of bit errors within the synchronizing signal. A step S83-i detects a synchronization error in a corresponding synchronizing signal i from among the N kinds of synchronizing signals. A step S84-i decides whether or not (N−1) or more synchronization errors are detected, including the other kinds of synchronizing signals. If the decision result in the step S84-i is YES, a step S86 ends the synchronization error detection process, and the process returns to the step S78. On he other hand, if the decision result in the step S84-i is NO, a step S85-i decides whether or not the synchronization of the corresponding kind of synchronizing signal i is established. The process returns to the step S84-i if the decision result in the step S85-i is NO. In addition, the process returns to the step S83-i if the decision result in the step S85-i is YES. The steps S83-i through S85-i are carried out in parallel for i=1 to N.

Each step S83-i carries out the process shown in FIG. 26 with respect to the corresponding kind of synchronizing signal i. Steps S801-1 through S801-M are carried out in parallel, where M is an arbitrary integer. A step S801-j starts a process of detecting a synchronization error of a synchronizing signal position (part) j of the corresponding kind of synchronizing signal i, where j=1 to M. A step S802-j decides whether or not the synchronization is lost when the number of bit errors is less than or equal to the tolerable number m3 of bit errors. When the decision result in the step S802-j becomes YES, a step S803-j sets a number s1 of times the synchronizing signal is lost to s1=0. A step S804-j decides whether or not the synchronization is lost when the number of bit errors is less than or equal to the tolerable number m3 of bit errors. The process returns to the step S802-j if the decision result in the step S804-j is NO. On the other hand, if the decision result in the step S804-j is YES, a step S805-j increments the number s1 of times the synchronizing signal is lost to s1=s1+1, and a step S806-j decides whether or not the number s1 of times the synchronizing signal is lost is equal to the number n3 of times the synchronizing signal is consecutively lost.

If the decision result in the step S806-j is NO, the process returns to the step S804-j. In addition, if the decision result in the step S806-j is YES, a step S807-j decides whether or not s1=n3 is detected at (M−1) or more synchronizing signal positions, including the other kinds of synchronizing signals. If the decision result in the step S807-j is YES, a step S809 ends the synchronization error detection, and the process returns to the step S84-i shown in FIG. 25. On the other hand, if the decision result in the step S807-j is NO, a step S808-j decides whether or not the synchronization is established at the synchronizing signal position j. The process returns to the step S807-j if the decision result in the step S808-j is NO. In addition, the process returns to the step S801-j if the decision result in the step S808-j is YES.

Figure 27:
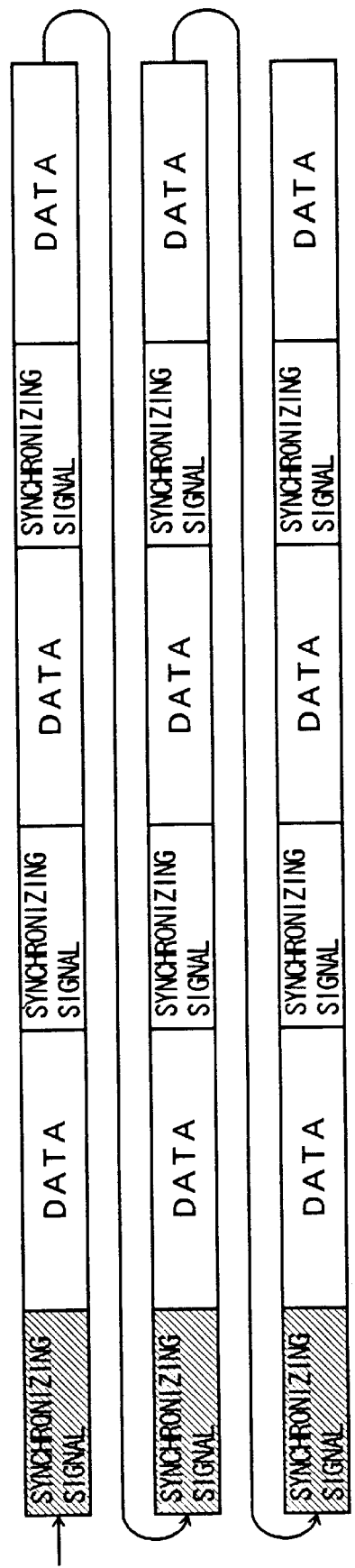
FIG. 27 is a diagram for explaining the detection of a synchronization error when there is 1 kind of synchronizing signal.

Accordingly, if the number of kinds of synchronizing signals is 1 and N=1, and the number of protection stages for the synchronization error detection is 3 and M=3, it is regarded that the synchronization is detected unless the synchronizing signal is consecutively lost n3 times at all of a first synchronizing signal position 1, a second synchronizing signal position 2 and a third synchronizing signal position 3, as indicated by the hatching in FIG. 27. For this reason, compared to the case where the synchronization is not detected unless the synchronizing signal is consecutively detected a predetermined number of times at all of the synchronizing signal positions, it is possible to detect the absolute phase even if there exists a synchronizing signal position where the synchronizing signal is not consecutively detected the predetermined number of times due to noise.

Figure 28:
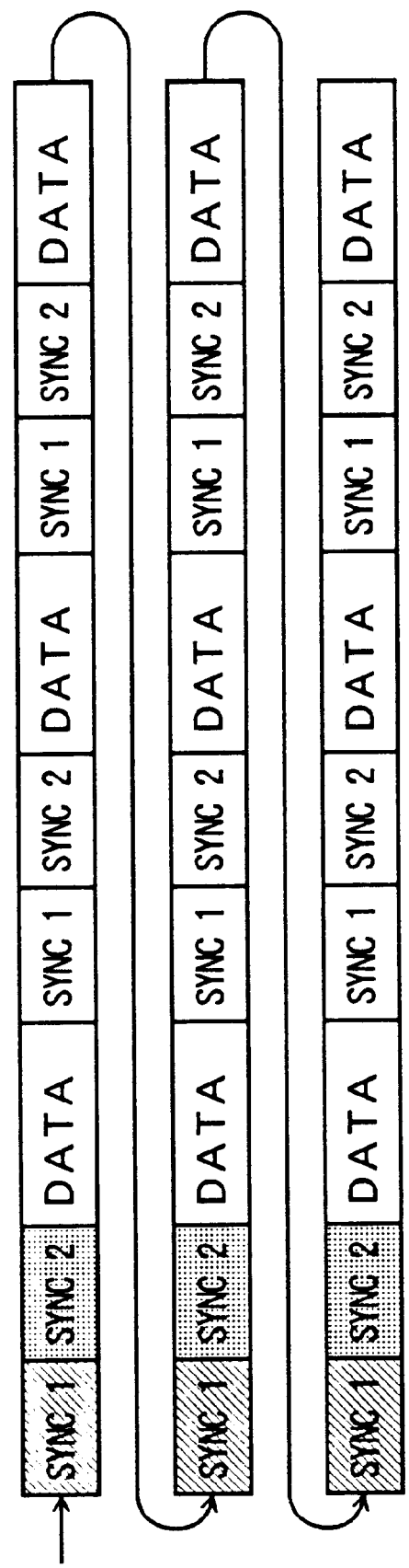
FIG. 28 is a diagram for explaining the detection of a synchronization error when there are 2 kinds of synchronizing signals.

In addition, if the number of kinds of synchronizing signals is 2 and N=2, and the number of protection stages for the synchronization error detection is 3 and M=3, it is regarded that the synchronization is detected unless a first kind of synchronizing signal is consecutively lost n3 times at all of a first synchronizing signal position 1, a second synchronizing signal position 2 and a third synchronizing signal position 3, as indicated by the hatching in FIG. 28, and a second kind of synchronizing signal is consecutively lost n3 times at all of a first synchronizing signal position 1, a second synchronizing signal position 2 and a third synchronizing signal position 3, as indicated by the shading in FIG. 28. For this reason, compared to the case where the synchronization is not detected unless the 2 kinds of synchronizing signals are consecutively detected a predetermined number of times at all of the synchronizing signal positions, it is possible to detect the absolute phase even if there exists a synchronizing signal position where the first and synchronizing signal are not consecutively detected the predetermined number of times due to noise. Furthermore, even if a pattern accidentally identical to that of the synchronizing signal is generated in the data part, it is possible to positively prevent such a data pattern from being erroneously detected as the synchronizing signal and thus prevent an erroneous synchronization detection.

Next, a description will be given of an eighth embodiment of the process of the step S5 shown in FIG. 7. In this embodiment, when one or a plurality of kinds of synchronizing signals exist within the received signal, the absolute phase of the signal points of the received signal is detected by the second phase detecting method by independently providing protection stages for the synchronization error detection in synchronizing signal parts of the one or plurality of synchronizing signals.

Figure 29:
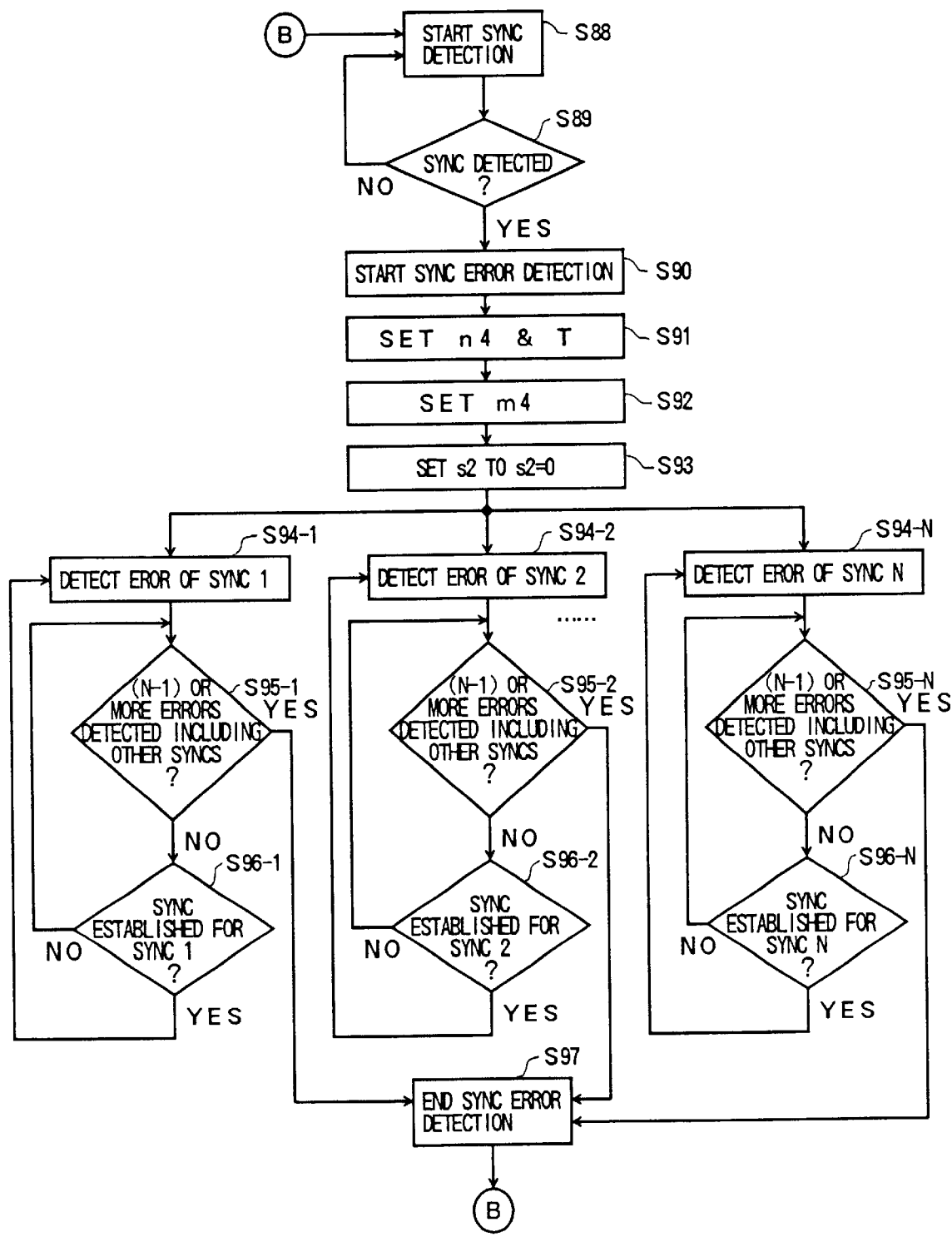
FIG. 29 is a flow chart showing an eighth embodiment of the process of the step S5 shown in FIG. 7.
Figure 30:
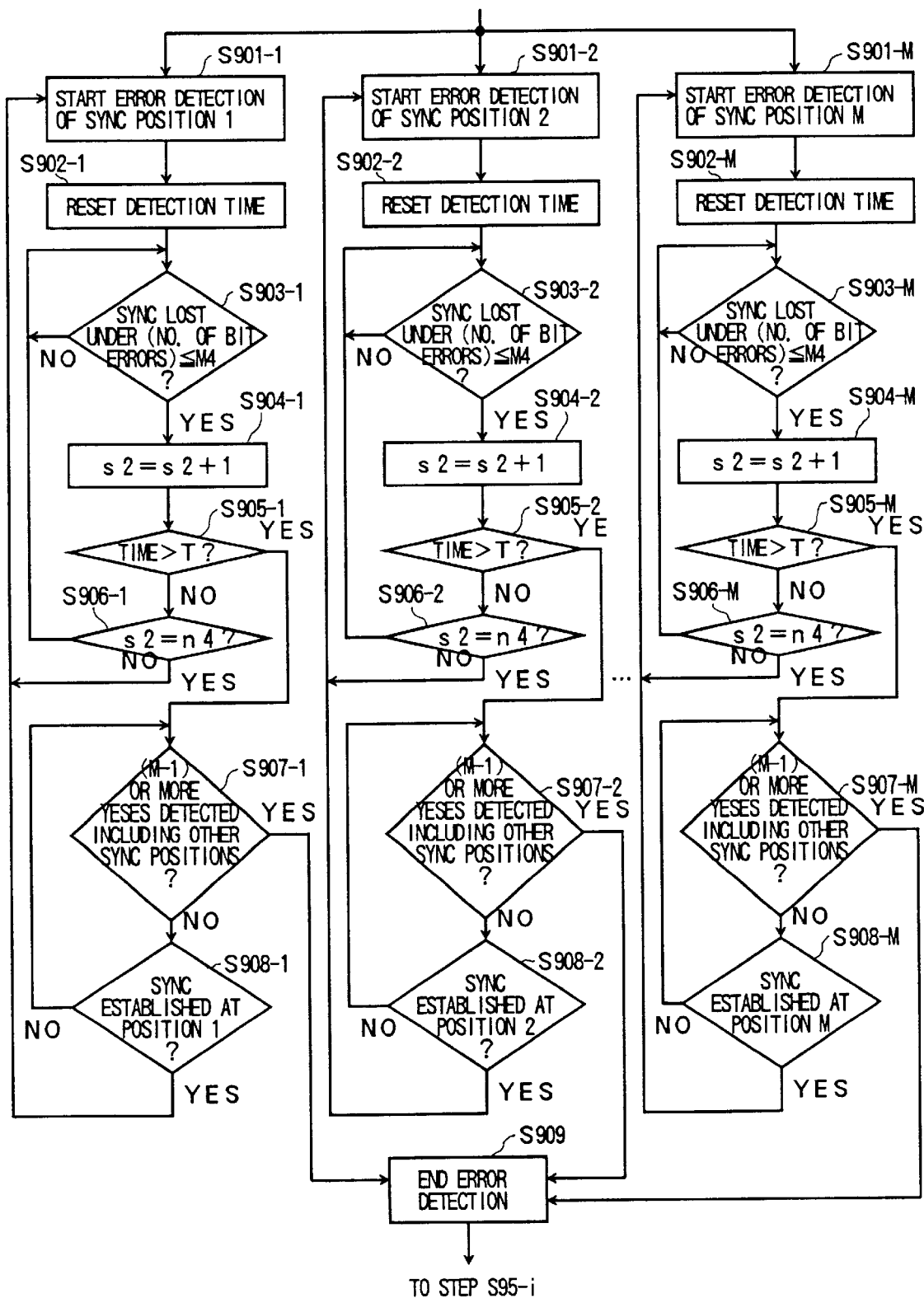
FIG. 30 is a flow chart showing the details of a step S94-i shown in FIG. 29.

FIG. 29 is a flow chart showing the eighth embodiment of the process of the step S5 shown in FIG. 7, and FIG. 30 is a flow chart showing the details of a step S94-i shown in FIG. 29, where i=1 to N.

In FIG. 29, when the step S5 is started, a step S88 starts a synchronization detection process, and a step S89 decides whether or not the synchronization detection was successful. The process returns to the step S88 if the decision result in the step S89 is NO. On the other hand, the process advances to a step S90 if the decision result in the step S89 is YES. For example, the steps S88 and S89 may carry out the synchronization detection by the process shown in FIG. 18 or FIG. 23 described above.

The step S90 starts a synchronization error detection process. A step S91 sets a threshold n4 of the number of times the synchronizing signal is received, and a reception time T. A step S92 sets a tolerable number m4 of bit errors within the synchronizing signal. A step S93 sets a number s2 of times the synchronizing signal is received to s2=0. A step S94-i detects a synchronization error of a corresponding synchronizing signal i. where i=1 to N. A step S95-i decides whether or not (N−1) or more synchronization errors are detected, including the other kinds of synchronizing signals. A step S97 ends the synchronization error detection process if the decision result in the step S95-i is YES, and the process returns to the step S88. On the other hand, if the decision result in the step S95-i is NO, a step S96-i decides whether or not the synchronization of the corresponding kind of synchronizing signal i is established. The process returns to the step S95-i if the decision result in the step S96-i is NO. In addition, the process returns to the step S94-i if the decision result in the step S96-i is YES. The steps S94-i through S96-i are carried out in parallel for i=1 to N.

Each step S94-i carries out the process shown in FIG. 30 with respect to the corresponding kind of synchronizing signal i. Steps S901-1 through S901-M are carried out in parallel, where M is an arbitrary integer. A step S901-j starts a process of detecting a synchronization error of a synchronizing signal position (part) j of the corresponding kind of synchronizing signal i, where j=1 to M. A step S902-j resets a synchronizing signal detection time, and a step S903-j decides whether or not the synchronization is lost when the number of bit errors is less than or equal to the tolerable number m4 of bit errors. When the decision result in the step S903-j becomes YES, a step S803-j increments the number s2 of times the synchronizing signal is received to s2=s2+1. A step S905-j decides whether or not the synchronizing signal detection time is longer than the reception time T. If the decision result in the step S905-j is NO, a step S906-j decides whether or not the number s2 of times the synchronizing signal is received is equal to the threshold n4 of the number of times the synchronizing signal is received.

If the decision result in the step S906-j is NO, the process returns to the step S903-j. In addition, if the decision result in the step S906-j is YES, the process returns to the step S901-j. On the other hand, if the decision result in the step S905-j is YES, a step S907-j decides whether or not the synchronizing signal detection time is longer than the reception time T at (M−1) or more synchronizing signal positions, including the other kinds of synchronizing signals. If the decision result in the step S907-j is YES, a step S909 ends the synchronization error detection, and the process returns to the step S95-i shown in FIG. 29. On the other hand, if the decision result in the step S907-j is NO, a step S908-j decides whether or not the synchronization is established at the synchronizing signal position j. The process returns to the step S907-j if the decision result in the step S908-j is NO. In addition, the process returns to the step S901-j if the decision result in the step S908-j is YES.

Accordingly, if the number of kinds of synchronizing signals is 1 and N=1, and the number of protection stages for the synchronization error detection is 3 and M=3, it is regarded that the synchronization is detected unless the synchronizing signal is lost n4 times at all of a first synchronizing signal position 1, a second synchronizing signal position 2 and a third synchronizing signal position 3, as indicated by the hatching in FIG. 27. For this reason, compared to the case where the synchronization is not detected unless the synchronizing signal is consecutively detected a predetermined number of times at all of the synchronizing signal positions, it is possible to detect the absolute phase even if there exists a synchronizing signal position where the synchronizing signal is not consecutively detected the predetermined number of times due to noise.

In addition, if the number of kinds of synchronizing signals is 2 and N=2, and the number of protection stages for the synchronization error detection is 3 and M=3, it is regarded that the synchronization is detected unless a first kind of synchronizing signal is lost n4 times at all of a first synchronizing signal position 1, a second synchronizing signal position 2 and a third synchronizing signal position 3, as indicated by the hatching in FIG. 28, and a second kind of synchronizing signal is lost n4 times at all of a first synchronizing signal position 1, a second synchronizing signal position 2 and a third synchronizing signal position 3, as indicated by the shading in FIG. 28. For this reason, compared to the case where the synchronization is not detected unless the 2 kinds of synchronizing signals are consecutively detected a predetermined number of times at all of the synchronizing signal positions, it is possible to detect the absolute phase even if there exists a synchronizing signal position where the first and synchronizing signal are not consecutively detected the predetermined number of times due to noise. Furthermore, even if a pattern accidentally identical to that of the synchronizing signal is generated in the data part, it is possible to positively prevent such a data pattern from being erroneously detected as the synchronizing signal and thus prevent an erroneous synchronization detection.

In each of the embodiments described above, the present invention is applied to the digital satellite broadcast system. However, the present invention is of course similarly applicable to any communication system which is constructed to demodulate the received signal which is received by a demodulator unit, by detecting the absolute phase of the signal points of the received signal.

Further, the present invention is not limited to these embodiments, but various variations and modifications may be made without departing from the scope of the present invention.

What is claimed is:

1. A demodulating method for demodulating a received signal received by a demodulator unit, comprising:

detecting an absolute phase of signal points of the received signal by a first phase detecting method;

detecting the absolute phase by a second phase detecting method in parallel with said detecting of the absolute phase by the first phase detecting method, said second phase detecting method having a slower detection speed or a higher detection accuracy than the first phase detecting method; and determining the absolute phase based on the detection of the absolute phase by each of the first and second detecting methods when the detection of the absolute phase by the first and second detecting methods are the same, and determining the absolute phase based on the phase detection result of said detection of the absolute phase by the second phase detecting method when the phase detection results of said detection of the absolute phase by each of the first and second detecting methods are different, wherein said demodulating method demodulates the received signal by detecting the absolute phase.

2. The demodulating method of claim 1, further comprising:

determining the absolute phase based on the phase detection result of said detection of the absolute phase by the second detecting method in response to a change in phase, after the absolute phase is determined by determining of the absolute value.

3. The demodulating method of claim 1, wherein said detection of the absolute phase by the first detecting method includes judging a synchronization detection based on a number of times a synchronizing signal which is periodically received from an existing phase detecting range is consecutively received.

4. The demodulating method of claim 3, wherein said detection of the absolute phase by the first detecting method includes carrying out the synchronization detection by overlapping each phase detecting range to an adjacent phase detecting range.

5. The demodulating method of claim 3, wherein said detection of the absolute phase by the first detecting method includes tolerating a predetermined number of bit errors in the synchronizing signal.

6. The demodulating method of claim 3, wherein said detection of the absolute phase by the first detecting method includes carrying out the synchronization detection in parallel with respect to each phase detecting range.

7. The demodulating method of claim 3, wherein said detection of the absolute phase by the first detecting method includes carrying out the synchronization detection with respect to each phase detecting range successively on a time base.

8. The demodulating method of claim 3, wherein said detection of the absolute phase by the first detecting method includes detecting the absolute phase after carrying out an error correction process with respect to the received signal.

9. The demodulating method of claim 3, wherein said detection of the absolute phase by the first detecting method includes detecting the absolute phase by judging a synchronization detection based on a number of times an arbitrary kind of synchronizing signal is consecutively received from among a plurality of kinds of synchronizing signals.

10. The demodulating method of claim 3, wherein said detection of the absolute phase by the first detecting method includes detecting the absolute phase by judging a synchronization detection based on a number of times arbitrary kinds of synchronizing signals are consecutively received from among a plurality of kinds of synchronizing signals.

11. The demodulating method of claim 3, wherein said detection of the absolute phase by the first detecting method includes independently providing protection stages for synchronization detection in synchronizing signal parts of one or a plurality of kinds of synchronizing signals, with the synchronization detection being judged when the synchronizing signal is consecutively received a predetermined number of times at any one of the synchronizing signal parts which are consecutive by a number corresponding to the protection stages.

12. The demodulating method of claim 3, wherein said detection of the absolute phase by the first detecting method includes independently providing protection stages for synchronization error detection in synchronizing signal parts of one or a plurality of synchronizing signals, with the synchronization detection being judged unless the synchronizing signal is consecutively lost a predetermined number of times at all of the synchronizing signal parts which are consecutive by a number corresponding to the protection stages.

13. The demodulating method of claim 12, wherein said detection of the absolute phase by the first detecting method includes tolerating a predetermined number of bit errors in the synchronizing signal when detecting synchronization error.

14. The demodulating method of claim 1, wherein said detection of the absolute phase by the second detecting method includes detecting the absolute phase by judging a synchronization detection based on an accumulation of a number of times a synchronizing signal periodically received from an existing phase detecting range is received.

15. The demodulating method of claim 14, wherein said detection of the absolute phase by the second detecting method includes carrying out the synchronization detection by overlapping each phase detecting range to an adjacent phase detecting range.

16. The demodulating method of claim 14, wherein said detection of the absolute phase by the second detecting method includes tolerating a predetermined number of bit errors in the synchronizing signal.

17. The demodulating method of claim 14, wherein said detection of the absolute phase by the second detecting method includes carrying out the synchronization detection in parallel with respect to each phase detecting range.

18. The demodulating method of claim 14, wherein said detection of the absolute phase by the second detecting method includes carrying out the synchronization detection with respect to each phase detecting range successively on a time base.

19. The demodulating method of claim 14, wherein said detection of the absolute phase by the second detecting method includes detecting the absolute phase by judging a synchronization detection based on a number of times an arbitrary kind of synchronizing signal is consecutively received from among a plurality of kinds of synchronizing signals.

20. The demodulating method of claim 14, wherein said detection of the absolute phase by the second detecting method includes detecting the absolute phase by judging a synchronization detection based on a number of times arbitrary kinds of synchronizing signals are consecutively received from among a plurality of kinds of synchronizing signals.

21. The demodulating method of claim 14, wherein said detection of the absolute phase by the second detecting method includes independently providing protection stages for synchronization detection in synchronizing signal parts of one or a plurality of kinds of synchronizing signals, with the synchronization detection being judged when the synchronizing signal is consecutively received a predetermined number of times at any one of the synchronizing signal parts which are consecutive by a number corresponding to the protection stages.

22. The demodulating method of claim 14, wherein said detection of the absolute phase by the second detecting method includes independently providing protection stages for synchronization error detection in synchronizing signal parts of one or a plurality of synchronizing signals, with the synchronization detection being judged unless the synchronizing signal is consecutively lost a predetermined number of times at all of the synchronizing signal parts which are consecutive by a number corresponding to the protection stages.

23. The demodulating method of claim 22, wherein said detection of the absolute phase by the second detecting method includes tolerating a predetermined number of bit errors in the synchronizing signal when detecting synchronization error.

24. The demodulating method of claim 3, wherein the received signal includes signals modulated by two or more kinds of modulation techniques, and determining of the absolute phase includes determining a phase detecting range based on a modulation technique having a largest degree of modulation.

25. A receiver apparatus having a demodulator unit which demodulates a received signal, comprising:

a first detector to detect an absolute phase of signal points of the received signal by a first phase detecting method;

a second detector to detect the absolute phase by a second phase detecting method in parallel with said first detector, said second phase detecting method having a slower detection speed or a higher detection accuracy than the first phase detecting method; and a phase determination unit to determine the absolute phase based on a phase detection result of said first detector when phase detection results of said first and second detectors are the same, and determining the absolute phase based on the phase detection result of said second detector when the phase detection results of said first and second detectors are different, wherein said demodulating unit demodulates the received signal by detecting the absolute phase.

26. The receiver apparatus of claim 25, further comprising:

a phase corrector to determine the absolute phase based on the phase detection result of said second detector in response to a change in phase, after the absolute phase is determined by said phase determination unit.

27. The receiver apparatus of claim 25, wherein said first detector detects the absolute phase by judging a synchronization detection based on a number of times a synchronizing signal which is periodically received from an existing phase detecting range is consecutively received.

28. The receiver apparatus of claim 27, wherein said first detector carries out the synchronization detection by overlapping each phase detecting range to an adjacent phase detecting range.

29. The receiver apparatus of claim 27, wherein said first detector tolerates a predetermined number of bit errors in the synchronizing signal.

30. The receiver apparatus of claim 27, wherein said first detector carries out the synchronization detection in parallel with respect to each phase detecting range.

31. The receiver apparatus of claim 27, wherein said first detector carries out the synchronization detection with respect to each phase detecting range successively on a time base.

32. The receiver apparatus of claim 27, wherein said first detector detects the absolute phase after carrying out an error correction process with respect to the received signal.

33. The receiver apparatus of claim 27, wherein said first detector detects the absolute phase by judging a synchronization detection based on a number of times an arbitrary kind of synchronizing signal is consecutively received from among a plurality of kinds of synchronizing signals.

34. The receiver apparatus of claim 27, wherein said first detector detects the absolute phase by judging a synchronization detection based on a number of times arbitrary kinds of synchronizing signals are consecutively received from among a plurality of kinds of synchronizing signals.

35. The receiver apparatus of claim 27, wherein said first detector independently provides protection stages for synchronization detection in synchronizing signal parts of one or a plurality of kinds of synchronizing signals, with the synchronization detection being judged when the synchronizing signal is consecutively received a predetermined number of times at any one of the synchronizing signal parts which are consecutive by a number corresponding to the protection stages.

36. The receiver apparatus of claim 27, wherein said first detector independently provides protection stages for synchronization error detection in synchronizing signal parts of one or a plurality of synchronizing signals, with the synchronization detection being judged unless the synchronizing signal is consecutively lost a predetermined number of times at all of the synchronizing signal parts which are consecutive by a number corresponding to the protection stages.

37. The receiver apparatus of claim 36, wherein said first detector tolerates a predetermined number of bit errors in the synchronizing signal when detecting synchronization error.

38. The receiver apparatus of claim 25, wherein said second detector detects the absolute phase by judging a synchronization detection based on an accumulation of a number of times a synchronizing signal periodically received from an existing phase detecting range is received.

39. The receiver apparatus of claim 38, wherein said second detector carries out the synchronization detection by overlapping each phase detecting range to an adjacent phase detecting range.

40. The receiver apparatus of claim 38, wherein said second detector tolerates a predetermined number of bit errors in the synchronizing signal.

41. The receiver apparatus of claim 38, wherein said second detector carries out the synchronization detection in parallel with respect to each phase detecting range.

42. The receiver apparatus of claim 38, wherein said second detector carries out the synchronization detection with respect to each phase detecting range successively on a time base.

43. The receiver apparatus of claim 38, wherein said second detector detects the absolute phase by judging a synchronization detection based on a number of times an arbitrary kind of synchronizing signal is consecutively received from among a plurality of kinds of synchronizing signals.

44. The receiver apparatus of claim 38, wherein said second detector detects the absolute phase by judging a synchronization detection based on a number of times arbitrary kinds of synchronizing signals are consecutively received from among a plurality of kinds of synchronizing signals.

45. The receiver apparatus of claim 38, wherein said second detector independently provides protection stages for synchronization detection in synchronizing signal parts of one or a plurality of kinds of synchronizing signals, with the synchronization detection being judged when the synchronizing signal is consecutively received a predetermined number of times at any one of the synchronizing signal parts which are consecutive by a number corresponding to the protection stages.

46. The receiver apparatus of claim 38, wherein said second detector independently provides protection stages for synchronization error detection in synchronizing signal parts of one or a plurality of synchronizing signals, with the synchronization detection being judged unless the synchronizing signal is consecutively lost a predetermined number of times at all of the synchronizing signal parts which are consecutive by a number corresponding to the protection stages.

47. The receiver apparatus of claim 46, wherein said second detector tolerates a predetermined number of bit errors in the synchronizing signal when detecting synchronization error.

48. The receiver apparatus of claim 27, wherein the received signal includes signals modulated by two or more kinds of modulation techniques, and said phase determination unit determines a phase detecting range based on a modulation technique having a largest degree of modulation.

* * * * *